(12) United States Patent
Grey et al.

(10) Patent No.: US 10,080,475 B2
(45) Date of Patent: Sep. 25, 2018

(54) INDICATORS OF CLEANING EFFECTIVENESS OF VACUUM CLEANERS AND SYSTEMS TO FACILITATE COMPARISONS OF CLEANING EFFECTIVENESS OF VACUUM CLEANERS

(71) Applicant: Lowe's Companies, Inc., Morresville, NC (US)

(72) Inventors: Jonathan Bryant Grey, Huntersville, NC (US); Adriane Dian Cooley, Cornelius, NC (US); Bruce Ferris, Richmond, VA (US); Chris Murray, Richmond, VA (US); Elliott Hedman, Cambridge, MA (US); Brian Slate, Dalton, GA (US)

(73) Assignee: LOWE'S COMPANIES, INC., Mooresville, NC (US)

( * ) Notice: Subject to any disclaimer, the term of this patent is extended or adjusted under 35 U.S.C. 154(b) by 318 days.

(21) Appl. No.: 14/967,602

(22) Filed: Dec. 14, 2015

(65) Prior Publication Data

US 2016/0166125 A1 Jun. 16, 2016

Related U.S. Application Data

(60) Provisional application No. 62/092,588, filed on Dec. 16, 2014.

(51) Int. Cl.
| | |
|---|---|
| *A47L 9/19* | (2006.01) |
| *G09F 19/10* | (2006.01) |
| *A47L 9/00* | (2006.01) |
| *G01M 99/00* | (2011.01) |

(52) U.S. Cl.
CPC .................... *A47L 9/19* (2013.01); *A47L 9/00* (2013.01); *G01M 99/005* (2013.01); *G09F 19/10* (2013.01)

(58) Field of Classification Search
CPC ............ A47L 9/00; A47L 9/19; G01M 99/00; G01M 99/005; G09F 19/10
USPC ....... 116/264, 266, 273, 276; 15/246.2, 339; 434/381, 384
See application file for complete search history.

(56) References Cited

U.S. PATENT DOCUMENTS 1,227,842 A * 5/1917 Sellin .................. G01P 13/0013
116/273
1,796,153 A * 3/1931 Hoover .................. G09F 19/10
15/246.2
(Continued)

FOREIGN PATENT DOCUMENTS

| DE | 537166 C * 11/1931 | ............. G09F 19/10 |
|---|---|---|
| EP | 754428 A1 * 1/1997 | ............... A47L 9/19 |

(Continued)

OTHER PUBLICATIONS

Airflo Indicator. Baird Meter, Incorporated. Springfield, IL (Dec. 15, 2014), 6 pages.

*Primary Examiner* — R. A. Smith
(74) *Attorney, Agent, or Firm* — Kilpatrick Townsend & Stockton LLP

(57) ABSTRACT

Systems and indicators of cleaning effectiveness are provided for deployment in an environment where samples of different vacuum cleaners are displayed for consideration by potential purchasers or renters of such vacuum cleaners to facilitate comparisons of cleaning effectiveness between or among the different vacuum cleaners.

33 Claims, 19 Drawing Sheets

(56) References Cited

U.S. PATENT DOCUMENTS

| | | | | | |
|---|---|---|---|---|---|
| 1,889,705 | A | * | 11/1932 | Sherwood | G01F 1/22 |
| | | | | | 116/273 |
| 2,095,456 | A | * | 10/1937 | Smellie | G09F 19/10 |
| | | | | | 15/246.2 |
| 2,169,655 | A | * | 8/1939 | McCarthy | G09F 19/10 |
| | | | | | 434/384 |
| 2,930,147 | A | * | 3/1960 | Martinec | G09B 25/02 |
| | | | | | 434/370 |
| 3,857,277 | A | * | 12/1974 | Moore | G01F 1/26 |
| | | | | | 116/275 |
| 3,973,335 | A | * | 8/1976 | Price | G09B 23/12 |
| | | | | | 434/126 |
| 4,599,047 | A | * | 7/1986 | Nowlin et al. | G01P 13/0013 |
| | | | | | 116/273 |
| 5,798,697 | A | * | 8/1998 | Wiseman | G01P 13/0013 |
| | | | | | 116/112 |
| 6,993,985 | B2 | * | 2/2006 | Srebro | G01N 1/2273 |
| | | | | | 73/198 |
| 2009/0090035 | A1 | * | 4/2009 | Murray | G09F 1/08 |
| | | | | | 40/539 |

FOREIGN PATENT DOCUMENTS

| | | | | | | |
|---|---|---|---|---|---|---|
| GB | | 905474 | A | * | 9/1962 | A47L 9/19 |
| JP | | 04189325 | A | * | 7/1992 | A47L 9/19 |
| KR | | 1997064537 | | | 10/1997 | |

\* cited by examiner

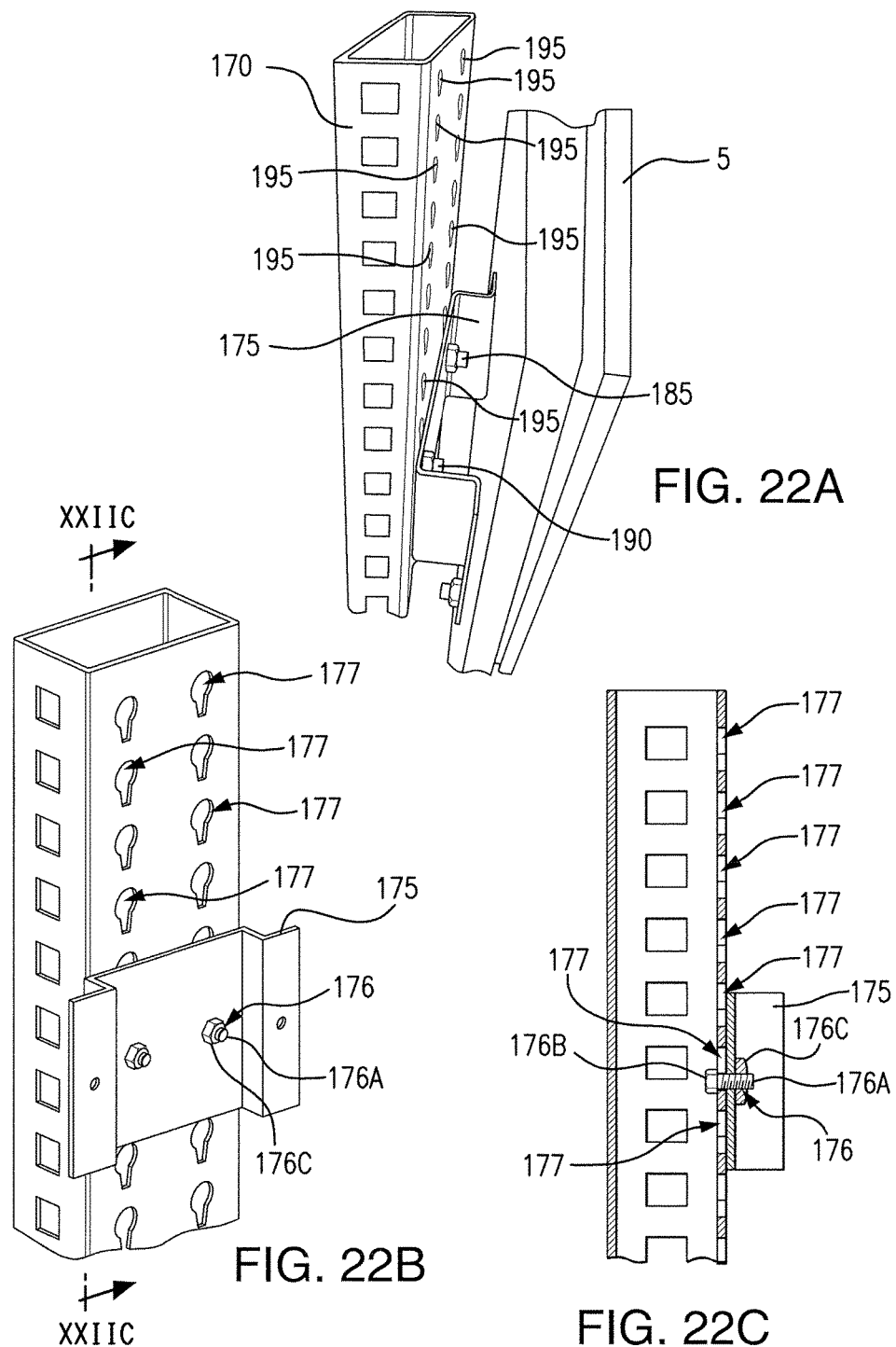

INDICATORS OF CLEANING EFFECTIVENESS OF VACUUM CLEANERS AND SYSTEMS TO FACILITATE COMPARISONS OF CLEANING EFFECTIVENESS OF VACUUM CLEANERS

CROSS REFERENCE TO RELATED APPLICATIONS

This application claims priority to U.S. Provisional Patent Application Ser. No. 62/092,588, filed on Dec. 16, 2014, which is hereby incorporated by reference in its entirety as through fully set forth herein.

FIELD OF THE INVENTION

Embodiments of the present invention relate generally to indicators of cleaning effectiveness of vacuum cleaners and to systems that facilitate comparisons of cleaning effectiveness among different vacuum cleaners.

BACKGROUND

Vacuum cleaners have enjoyed significant popularity over the years. There are numerous of types of vacuum cleaners, sizes of vacuum cleaners, and manufacturers of vacuum cleaners. In a retail environment, a consumer interested in purchasing or renting a vacuum cleaner can be presented with a variety of vacuum cleaner options and it can be difficult for the consumer to evaluate the different options. This can result in a gap between the customer's perception of the performance of each vacuum cleaner while in the store and the actual performance they experience once they get the selected vacuum cleaner home and try it out. Without the ability to tangibly experience the performance of the vacuum cleaners in a store or other retail environment, consumers often lack significant confidence in their purchase decision.

The performance of a vacuum cleaner is complicated, involving many variables, and can be measured in many different ways. The two primary factors that characterize the real-world performance of a vacuum cleaner are suction power (generally measured in "inches of water") and air flow (generally measured in cubic feet per minute (cfm)). A unit of measure called "air watts" is sometimes used to represent the combined "cleaning power" of these two factors:

$$\text{Air watts} = (\text{suction (inches of water lift)}) \times (\text{airflow (cfm)})/8.5$$

with the factor 8.5 being a conversion factor for calculations in English units. While quantitative measures exist to evaluate cleaning effectiveness, such approaches may not be practical in retail settings for a variety of reasons (e.g., cost, lack of familiarity among purchasers/renters, etc.).

In general, it would be advantageous to have improved indicators, systems, and methods for evaluating the cleaning effectiveness of vacuum cleaners. In particular, it would be advantageous to have indicators, systems, and methods for evaluating the cleaning effectiveness of vacuum cleaners in a retail environment to assist purchasers or renters of vacuum cleaners in comparing different vacuum cleaners.

BRIEF SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Various embodiments of the present invention relate to indicators of cleaning effectiveness between or among different vacuum cleaners and to systems to facilitate comparisons of cleaning effectiveness between or among different vacuum cleaners. Such indicators and systems can be deployed in environments where samples of different vacuum cleaners are displayed for consideration by potential purchasers or renters of such vacuum cleaners. Such indicators and systems, for example, can assist a potential purchaser or renter of a vacuum cleaner in evaluating the cleaning effectiveness among different vacuum cleaners to help him or her decide which vacuum cleaner to purchase or rent.

Certain embodiments of the invention provide an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, that comprises a vacuum response unit comprising a vertically extending elongate tube containing a plurality of items, and an air conduit comprising a first end that is selectively connectable to an input port of a vacuum cleaner, and a second end that is connected to the vacuum response unit, wherein the plurality of items are adapted to rise in the tube when sufficient suction power is provided by a vacuum cleaner after being connected to the air conduit.

In another embodiment, an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprises a mounting mechanism for securing the indicator to a display system where the samples are displayed, a vacuum response unit comprising a vertically extending elongate tube containing a plurality of items, and an air conduit having a first end that is selectively connectable to an input port of a vacuum cleaner, and a second end that is connected to the vacuum response unit, wherein the plurality of items are adapted to move in the tube when sufficient suction power is provided by a vacuum cleaner after being connected to the air conduit.

In some embodiments, an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprises a vacuum response unit comprising a vertically extending elongate tube containing a plurality of items, and an air conduit having a first end comprising an adaptor for facilitating connection of the conduit to a plurality of different size input ports of vacuum cleaners, and a second end that is connected to the vacuum response unit, wherein the plurality of items are adapted to move in the tube when sufficient suction power is provided by a vacuum cleaner after being connected to the air conduit. The adaptor, in some embodiments, can be configured to adapt the air conduit for connection to input ports on vacuum cleaners that have any one of the following nominal diameters: 1¼-inch, 1½-inch, or 2½-inch.

In some embodiments, an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprises a mounting mechanism for securing the indicator to a display system where the samples are displayed, a vacuum response unit adapted to respond to cleaning effectiveness of a vacuum cleaner by communicating an indication of cleaning effectiveness to a user of the indicator, and an air conduit having a first end that is selectively connectable to an input port of a vacuum cleaner, and a second end that is connected to the vacuum response unit.

A system to facilitate comparisons of cleaning effectiveness between or among different vacuum cleaners by potential purchasers or renters of such vacuum cleaners, the system, in some embodiments, comprises a plurality of different vacuum cleaners, a vacuum response unit comprising a vertically extending elongate tube containing a plurality of items, and an air conduit comprising a first end that is selectively connectable to an input port of at least two of the different vacuum cleaners, and a second end that is connected to the vacuum response unit, wherein the plurality of items are adapted to rise in the tube when sufficient suction power is provided by one of the plurality of vacuum cleaners after being connected to the air conduit.

These and other embodiments are presented in greater detail in the Detailed Description which follows.

BRIEF DESCRIPTION OF THE DRAWINGS

FIGS. 20-22A are perspective views illustrating one way in which an indicator can be secured to a display system according to one embodiment of the present invention.

FIG. 22B is a cutaway perspective view of a mounting mechanism for mounting of an indicator to a display system according to one embodiment of the presentation invention.

FIG. 22C is a cross-sectional view of the embodiment shown in FIG. 22B.

DETAILED DESCRIPTION

Figure 1:
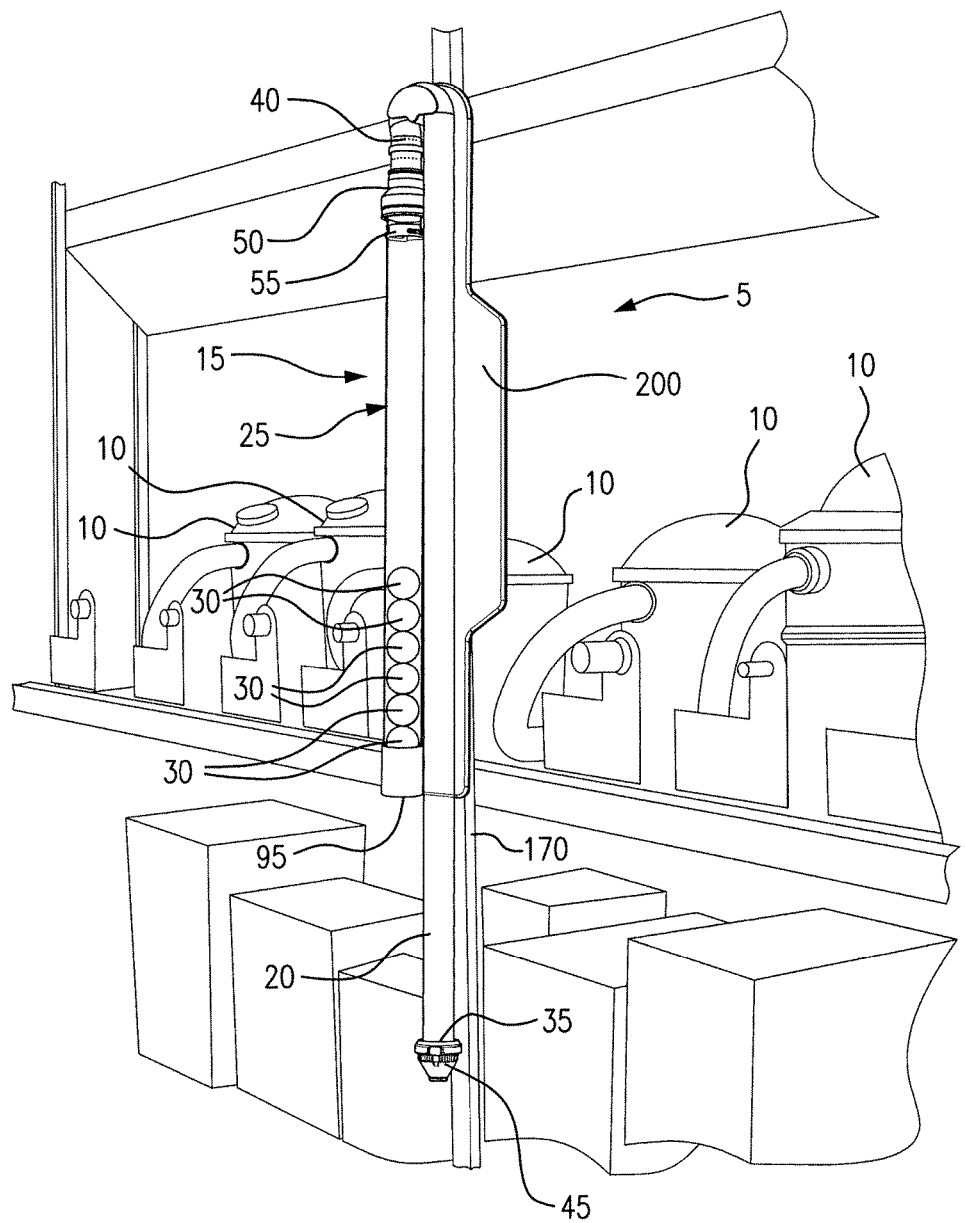
FIG. 1 illustrates a system to facilitate comparisons of cleaning effectiveness between or among different vacuum cleaners by potential purchasers or renters of such vacuum cleaners according to one embodiment of the present invention.

The subject matter of embodiments of the present invention is described here with specificity to meet statutory requirements, but this description is not necessarily intended to limit the scope of future claims. The subject matter to be claimed may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Various embodiments of the present invention relate to indicators of cleaning effectiveness between or among different vacuum cleaners and to systems to facilitate comparisons of cleaning effectiveness between or among different vacuum cleaners. Such indicators and systems can be deployed in environments where samples of different vacuum cleaners are displayed for consideration by potential purchasers or renters of such vacuum cleaners. Such indicators and systems, for example, can assist a potential purchaser or renter of a vacuum cleaner in evaluating the cleaning effectiveness among different vacuum cleaners to help him or her decide which vacuum cleaner to purchase or rent. For example, some embodiments of the present invention can assist potential purchasers or renters in tangibly experiencing the performance of the vacuum cleaners in a store or other retail environment. This can include, in some embodiments, assisting potential purchasers or renters in visually observing the suction power and air flow of different vacuum cleaners.

As used herein, the term "different vacuum cleaners" refers to two or more vacuum cleaners that are manufactured by different entities, sold under different names, have different model numbers, have different characteristics, features or specifications, and/or are otherwise different products that a potential purchaser or renter may be evaluating for purchase or rental.

Certain embodiments of the invention provide an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, that comprises a vacuum response unit comprising a vertically extending elongate tube containing a plurality of items, and an air conduit comprising a first end that is selectively connectable to an input port of a vacuum cleaner, and a second end that is connected to the vacuum response unit, wherein the plurality of items are adapted to rise in the tube when sufficient suction power is provided by a vacuum cleaner after being connected to the air conduit.

Some embodiments of the invention provide an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners that comprises a mounting mechanism for securing the indicator to a display system where the samples are displayed, a vacuum response unit comprising a vertically extending elongate tube containing a plurality of items, and an air conduit having a first end that is selectively connectable to an input port of a vacuum cleaner, and a second end that is connected to the vacuum response unit, wherein the plurality of items are adapted to move in the tube when sufficient suction power is provided by a vacuum cleaner after being connected to the air conduit.

Some embodiments of the present invention provide an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, that comprises a vacuum response unit comprising a vertically extending elongate tube containing a plurality of items, and an air conduit having a first end comprising an adaptor for facilitating connection of the conduit to a plurality of different size input ports of vacuum cleaners, and a second end that is connected to the vacuum response unit, wherein the plurality of items are adapted to move in the tube when sufficient suction power is provided by a vacuum cleaner after being connected to the air conduit.

Some embodiments of the present invention provide an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, that comprises a mounting mechanism for securing the indicator to a display system where the samples are displayed, a vacuum response unit adapted to respond to cleaning effectiveness of a vacuum cleaner by communicating an indication of cleaning effectiveness to a user of the indicator, and an air conduit having a first end that is selectively connectable to an input port of a vacuum cleaner, and a second end that is connected to the vacuum response unit.

In some embodiments, the first end of the air conduit is selectively connectable to the input port directly or indirectly. For example, with an indirect connection, a component, such as a second air conduit, can be positioned between the first end of the air conduit and the input port. In some such embodiments, the second air conduit can comprise a one-way check valve. The first air conduit can be selectively connectable to an input port of a second vacuum cleaner directly or indirectly, in some embodiments. In some such embodiments, for example, a component, such as a third air conduit can be positioned between the first air conduit and the input port of the second vacuum cleaner. The third air conduit, in some embodiments, can comprise a one-way check valve. As will be explained in more detail below, in some embodiments, the first air conduit can be connected to input ports of a plurality of vacuum cleaners. For example, a separate air conduit can connect the first air conduit to the input ports, and one-way check valves can be used to facilitate operation of the indicator as described further below.

In some embodiments, the indicator can comprise an adaptor for facilitating connection of an air conduit to a plurality of different sizes of input ports of vacuum cleaners. Such an adaptor, in some embodiments, can be configured to adapt the air conduit for connection to input ports on vacuum cleaners that have any one of the following nominal diameters: 1¼-inch, 1½-inch, or 2½-inch.

The second end of the air conduit can be directly or indirectly connected to the vacuum response unit in some embodiments. For example, with an indirect connection, in some embodiments, a component, such as another air conduit, a nozzle, or other structure, can be positioned between the second end of the air conduit and the vacuum response unit.

In some embodiments, indicators of the present invention can include signage that, for example, provides instructions on how to operate the indicator to provide an indication of cleaning effectiveness.

The vacuum response unit, in some embodiments, is adapted to provide an indication of cleaning effectiveness in a visual manner. For example, the vacuum response unit can visually indicate suction power and air flow of a vacuum cleaner in some embodiments. In some embodiments, the vacuum response unit can be adapted to respond to a combination of air flow and suction to achieve the indication of cleaning effectiveness.

As indicated above, in some embodiments, the vacuum response unit comprises a vertically extending elongate tube containing a plurality of items. In some such embodiments, the plurality of items can be arranged in the tube so as to rise against gravitational force in a manner indicative of cleaning effectiveness of a vacuum cleaner when activated and connected to the first end of the air conduit. The tube, in some embodiments, can be a hollow cylinder and have an inner diameter of less than 4 inches. The tube can be substantially transparent in some embodiments. In some embodiments, the plurality of items in the tube comprises a plurality of spheres with each sphere having a diameter of between 2.5 inches and 2.75 inches. In some embodiments comprising a plurality spheres having a diameter of between 2.5 and 2.75 inches, the inner diameter of the cylinder can be about 3 inches. In some embodiments where the plurality of items comprises a plurality of spheres, the difference between the inner diameter of the tube and the diameter of each sphere can be 0.5 inches or less. The plurality of items, in some embodiments, can comprise tennis balls.

The vacuum response unit, in some embodiments, can comprise a liquid arranged to respond visually to the cleaning effectiveness. In some embodiments, the liquid can be arranged to indicate cleaning effectiveness by rising against gravitational force.

Some embodiments of indicators can comprise a mounting mechanism for securing the indicator to a display system where the samples are displayed. Such a mounting mechanism, in some embodiments, can comprise at least one key hole engager adapted to secure the indicator to the display system using a key hole of the display system. In some embodiments, the mounting mechanism can comprise a bracket coupled to the indicator, wherein the bracket comprises at least one hole. In such embodiments utilizing bracket with at least one hole, the mounting mechanism can further comprise at least one fastener adapted to pass through the hole in the bracket and secure the indicator to the display system. Examples of such fasteners can include a bolt, a screw, a zip tie, a nail, a post, or other fasteners known to those of skill in the art.

The indicator, in some embodiments, can further comprise a responsiveness adjustment mechanism adapted to calibrate the responsiveness of the indicator to different ranges of cleaning effectiveness. The responsiveness adjustment mechanism, for example, can comprise a valve for selectively regulating a resistance to air flow into the vacuum response unit. As another example, the responsiveness adjustment mechanism can comprise an adjustable air intake in an air flow path between the vacuum response unit and the first end of the air conduit.

In some embodiments, the indicator can comprise a valve proximate the second end of the tube, wherein the valve is actuatable to selectively regulate air flow through the vacuum response unit.

Some embodiments of the present invention relate to systems to facilitate comparisons of cleaning effectiveness between or among different vacuum cleaners by potential purchasers or renters of such vacuum cleaners. In general, such systems can comprise a plurality of different vacuum cleaners and any of the indicators of the present invention disclosed herein. For example, in some embodiments, some such systems comprise a plurality of different vacuum cleaners, a vacuum response unit comprising a vertically extending elongate tube containing a plurality of items, and an air conduit comprising a first end that is selectively connectable to an input port of at least two of the different vacuum cleaners, and a second end that is connected to the vacuum response unit, wherein the plurality of items are adapted to rise in the tube when sufficient suction power is provided by one of the plurality of vacuum cleaners after being connected to the air conduit.

Certain aspects of the present invention will now be discussed in connection with the attached Figures which illustrate some embodiments of the present invention. Although the remainder of the description associated with the Figures will focus on embodiments of systems and indicators incorporating a vacuum response unit having a vertically extending elongate tube containing a plurality of spherical items, it should be understood that only slight modifications need to be made to the components in order to create alternative vacuum response units that can be utilized in other embodiments of systems and indicators. Further, while various components and features are illustrated and described in connection with the Figures, it should be understood that not all systems and indicators according to the present invention may utilize each of the components and features illustrated and described.

FIGS. 1-8 illustrate one embodiment of a system to facilitate comparisons of cleaning effectiveness between or among different vacuum cleaners 10 by potential purchasers or renters. The system shown in FIG. 1 includes an indicator 5 comprising a number of components discussed in more detail below. The indicator 5 is shown in connection with a retail display of the vacuum cleaners 10 to illustrate potential implementation in a retail environment where the indicator 5 can be used to assist consumers (e.g., potential purchasers or renters) in deciding on a vacuum cleaner to rent or purchase based at least in part on cleaning effectiveness.

The indicator 5 comprises a vacuum response unit 15 and an air conduit 20. In the embodiment shown, the vacuum response unit 15 includes a vertically extending elongate tube 25 containing a plurality of items 30. While the term "tube" is used herein, it should be understood that the term "tube" is not intended to limit the component to structures having only round cross-sections and that the term "tube" should be understood to include supports with square, rectangular, triangular, oval, hexagonal, octagonal, pentagonal, or other cross-sections. Also, while the tube is characterized as "vertically extending," it should be understood that the tube is not required to be exactly vertical. A vertically extending aspect of the tube can allow the plurality of items to rise against gravitational force (i.e., overcome the force of gravity to rise in the tube) when a vacuum cleaner is activated and connected to the air conduit. In other words, with a vertically extending tube, gravitational force provides resistance to the plurality of items such that the gravitational force must be overcome in order for one or more of the plurality of items to rise in the tube. A particular vacuum cleaner's ability to draw one or more items upward in the tube is an indicator of cleaning effectiveness of the vacuum cleaner according to some embodiments of the present invention.

As the plurality of items in the tube would still need to overcome gravitational force even if the tube were angled, the tube is not required to be exactly vertical. For example, in some embodiments, the tube can extend vertically even when it is not substantially vertically oriented (i.e., when it is not oriented within a range of +/−30° from vertical). The tube also can be characterized as "vertically extending" if for example, it is configured with a more gradual rise (i.e., oriented more than 30° from vertical), if it is curved with an upward extent, if it is configured to have an upward spiral, or if it otherwise has a configuration that allows items within the tube to rise in height for some extent even if movement of the items is not limited to only upward movement and even if the rise requires some translational component of movement or movement along a spiral, incline, or curve. A vertical orientation or substantially vertical orientation may be desirable in some embodiments, for example, where lateral space is limited and/or vacuum cleaners are to be located or displayed on multiple sides of the tube.

Figure 8:
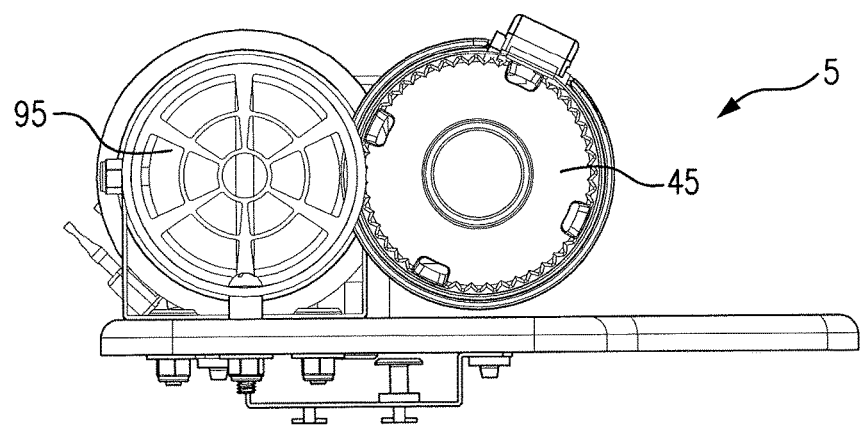
FIG. 8 is a bottom view of the embodiment of an indicator shown in FIG. 3.
Figure 8A:
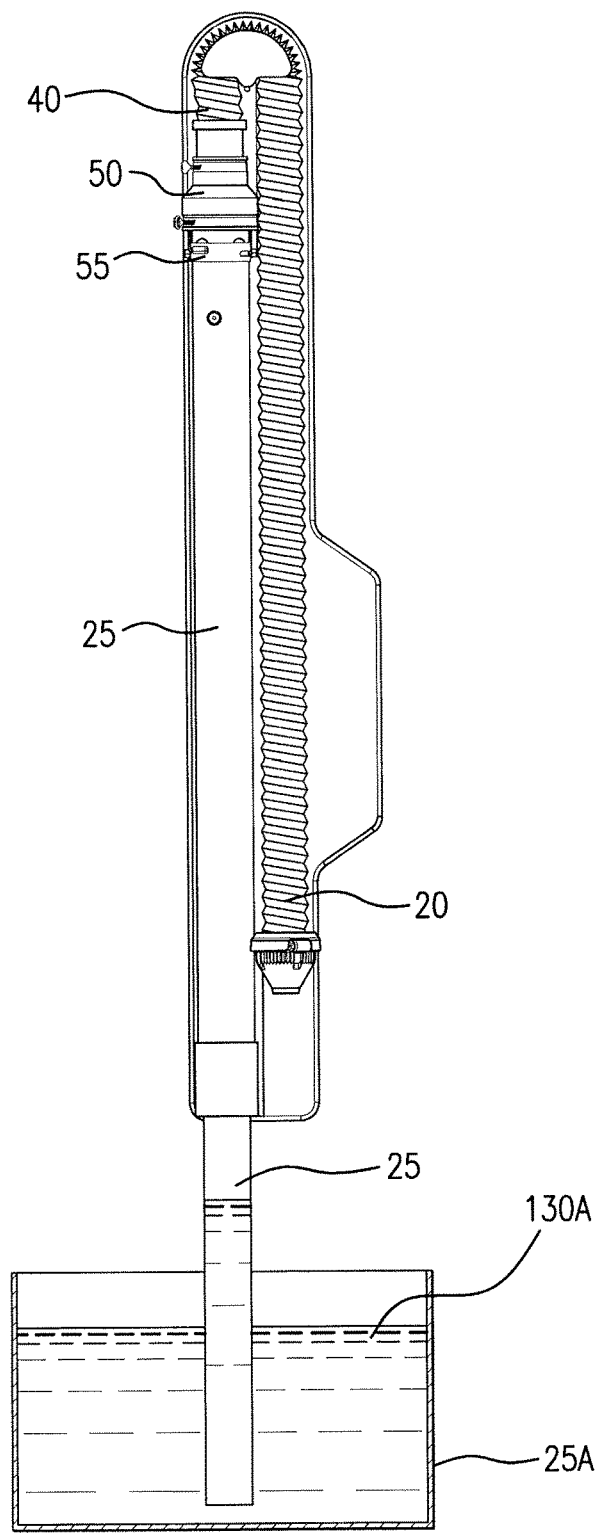
FIG. 8A is a schematic view of a liquid-based indicator according to an embodiment of the present invention.
Figure 9:
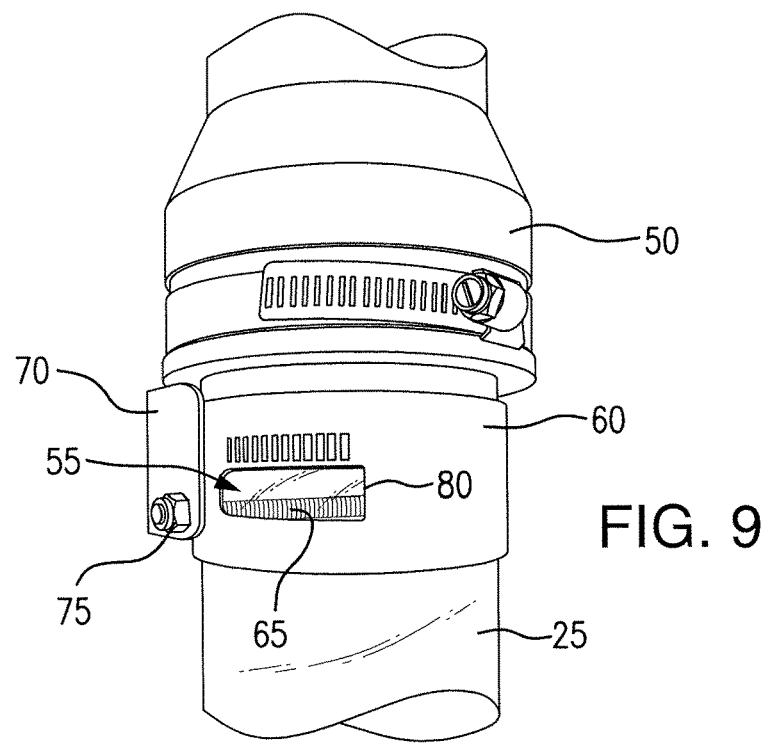
FIGS. 9-12 are perspective views of a portion of the indicator shown in FIG. 3, and illustrate one embodiment of a valve for selectively regulating a resistance to air flow into a vacuum response unit according to one embodiment of the present invention.

In some embodiments, as shown in FIG. 8A, the tube 25 can be connected to a liquid reservoir 25A from which liquid 130A is drawn into the tube 25 to a height that visually indicates cleaning effectiveness of a vacuum cleaner. Although the tube 25 is shown with a straight configuration, the tube 25 can be made of flexible material or shaped to allow the tube to be coiled in a spiral pattern around a vertical post to provide the appearance of a liquid travel distance that is longer than the travel distance in a straight tube.

In some embodiments, the vacuum response unit 15 can be configured to operate independently of gravity. For example, the items 30 can be biased toward a desired starting position by a force other than gravity (e.g., one or more spring force, magnetic force, elastic force, hydraulic force, and/or pneumatic force) which vacuum cleaners with a selected range of performance characteristics can overcome, and the indication can be provided by movement of the items with or without a rise. This and other embodiments can be adapted to respond to cleaning effectiveness of a vacuum cleaner by communicating an indication of cleaning effectiveness to a user of the indicator 5, with or without having a vertically extending tube or other vertically extending vacuum response unit. Thus, although gravity provides a convenient resistance to movement of the one or more items 30, the vacuum response unit 15 can be configured to apply a different source of resistance and can be oriented without any vertical extent through which the one or more items 30 move.

In the embodiment shown in FIGS. 1-8, the plurality of items 30 in the tube 25 comprise a plurality of spheres. The plurality of spheres 30 in this particular embodiment are tennis balls, although other sizes and types of spheres can be used. Tennis balls are particularly convenient because they are readily available in large quantities and are brightly colored to enhance the visual effect of the indicator 5. In other embodiments, the plurality of items can be other shapes including, for example, cylinders, squares, rectangular solids, pyramids, and others. A number of factors can be considered in selecting a shape for the plurality of items including, for example, the length of the tube, the cross-sectional shape of the tube, the desired number of items to include in the tube, the power of the vacuum cleaners to be compared, and others. One advantage of using spheres is that the outer surface area of each sphere available to contact the inner surface of the tube is minimized. This minimizes the effect of friction on the perceived cleaning effectiveness of the vacuum cleaners being compared. For example, if the plurality of items were cylindrical and were positioned in a cylindrical tube, it is conceivable that the relative position of the cylindrical items within the tube (e.g., centered within the tube vs. contacting a portion of the inner surface of the tube) could result in more/less friction and impact the speed at which the cylindrical items travel up the tube. However, this is not to say that cylindrical items could not be used in a cylindrical tube as other parameters could be adjusted to minimize friction effects (e.g., increase the difference in diameter of the tube relative to the diameter of the cylindrical items). Persons of skill in the art can identify the appropriate shape for the plurality of items based on the disclosure herein.

As indicated above, the relative size of the tube 25 and the plurality of items 30 can also be selected to achieve desired correspondence between vacuum performance and the response of the items 30. The difference between the diameter (or other relevant dimension) of the item and the inner diameter (or other relevant dimension) of the tube 25 can be selected to provide a desired correspondence between movement of the items 30 and the cleaning effectiveness of a vacuum cleaner in some embodiments. As noted in the Background section, two primary factors that comprise the real-world performance of a vacuum cleaner are suction power and air flow. In some embodiments, the relative sizes of the plurality of items 30 and the tube 25 can be selected so as to provide observable results that approximate the cleaning power of the vacuum cleaners relative to each other. In other words, the gap between the plurality of items 30 and the cross-sectional area of the tube 25 can be selected so that the items 30 respond in a manner that visually indicates both suction power and air flow, in some embodiments. For example, if the gap between the plurality of items 30 and the cross-sectional area of the tube 25 is too small, the indicator 5 may primarily indicate suction power. Likewise, if the gap between the plurality of items 30 and the cross-sectional area of the tube 25 is too large, the indicator 5 may primarily indicate air flow. While some embodiments of the present invention may only visually indicate one of these properties, in other embodiments, the indicator 5 may visually indicate both properties.

Focusing on embodiments where the tube 25 is a hollow cylinder and the plurality of items are spheres 30, the difference between the inner diameter of the tube and the diameter of each sphere can be 0.5 inches or less in some embodiments. For example, in some embodiments, the inner diameter of the tube can be four inches or less and the diameter of each sphere can be at least about 2.5 inches. In embodiments where the plurality of items comprise tennis balls, each tennis ball can have a diameter of between 2.5 inches and 2.75 inches, and the hollow cylinder can have a diameter of about 3 inches. In some embodiments, the plurality of items can be a combination of one or more tennis balls and one or more other balls that are heavier and/or more resistant to rising in response to cleaning effectiveness of a vacuum cleaner than the tennis balls (e.g., billiard balls, baseballs, and/or golf balls) and that are arranged to weigh down the tennis ball(s). In embodiments utilizing tennis balls or spheres having a diameter between 2.5 inches and 2.75 inches and a hollow cylinder with a diameter of about 3 inches, an indicator 5 can advantageously visually indicate both the suction power and the air speed of a vacuum cleaner. Based on the teachings herein, persons of skill in the art can identify relative dimensions of the spheres and the inner diameter of the hollow cylinder to provide similar advantages. Likewise, when other shapes are selected for the plurality of items and for the cross-section of the tube, persons of skill in the art can also select appropriate relative dimensions based on the teachings herein.

The number of items in the hollow tube can also vary depending on a number of factors including, for example, the power of the vacuum cleaners to be compared, the length of the tube, the shape and dimensions of the tube's cross-section, the shape and dimensions of the items, the difference between the size of the tube's cross-section and the size of the items, the weight and density of the items, the material from which the items are constructed, and other factors. In general, a vacuum response unit can include an adequate number of items to visually indicate differences among the various vacuum cleaners with regard to suction power and/or air flow. In some embodiments, the tube comprises at least two items. The tube comprises at least three items in some embodiments. In some embodiments, the tube comprises at least five items. Depending on the configuration, too many items may hamper the ability of the vacuum response unit to visually indicate the cleaning effectiveness of the vacuum cleaners. Thus, in some embodiments, the tube comprises ten or fewer items. The tube comprises eight or fewer items in some embodiments.

In some embodiments, rather than incorporating a vertically extending elongate tube containing a plurality of items, a vacuum response unit for use in a system or indicator can comprise a liquid arranged to respond visually to indicate cleaning effectiveness. For example, in some embodiments, the liquid can be positioned in a tube or other container, and its movement within such container can communicate an indication of cleaning effectiveness to a user of the indicator or system. The liquid, in some embodiments, can be arranged to indicate cleaning effectiveness by rising against gravitational force. For example, the air conduit that is connected (directly or indirectly) to an input of a vacuum cleaner can be connected to an upper portion of the tube or container holding the liquid such that liquid would be pulled upward in response to the vacuum cleaner being activated. Non-limiting examples of liquids that can be used in such embodiments of the present invention include, for example, water, various plant oils (e.g., corn oil, olive oil, canola oil, soybean oil, peanut oil, etc.), and others readily identified by persons of skill in the art based on the teachings herein. Likewise, persons of skill in the art can readily design, based on the teachings herein, tubes or other containers to hold the liquid based on a variety of factors including the color of the liquid, the viscosity of the liquid, the desired size of the vacuum response unit, the sizes of the vacuum cleaners to be compared, and other factors. The liquid can include a colorant in some embodiments to make the liquid more distinct, apparent, or otherwise visible.

In some embodiments, the tube in a vacuum response unit is substantially transparent. In the embodiment shown in FIGS. 1-8, the tube 25 is almost entirely transparent. In some embodiments, the tube is at least translucent or at least partially transparent. The use of a translucent tube or an at least partially transparent tube advantageously permits a user to observe the movement of the plurality of items, liquid, or other material(s) within the tube in response to activation of a vacuum cleaner. In some embodiments, at least 50% of the tube, based on surface area, is transparent. At least 25% of the surface area of the tube is transparent in some embodiments. At least 10% of the surface area of the tube, in some embodiments, is transparent. In some embodiments, at least 75% of the tube, based on surface area, is transparent.

The embodiment shown in FIGS. 1-8 comprises an air conduit 20. The air conduit 20 comprises a first end 35 that is selectively connectable to an input port of a vacuum cleaner and a second end 40 that is connected to the vacuum response unit 15. The air conduit 20 can be connected to the input port of a vacuum cleaner directly or indirectly. With an indirect connection, there is another component between the first end 35 of the air conduit 20 and the input port. In the embodiment shown in FIGS. 1-8, a nozzle or adaptor 45 is coupled to the first end 35 of the air conduit and can be connected directly to the input port as discussed in more detail below. In some other embodiments, a different component can be coupled to the first end 35 of the air conduit 20 and/or to the input port of a vacuum cleaner 10 such that the air conduit 20 is indirectly coupled to the input port. In other embodiments, the first end 35 of the air conduit 20 can be coupled directly to the input port of a vacuum cleaner 10. The first end 35 of the air conduit 20 is selectively connectable to an input port of a vacuum cleaner 10 as it can be connected to two or more vacuum cleaners in order for a potential purchaser or renter to evaluate cleaning effectiveness.

Figure 2:
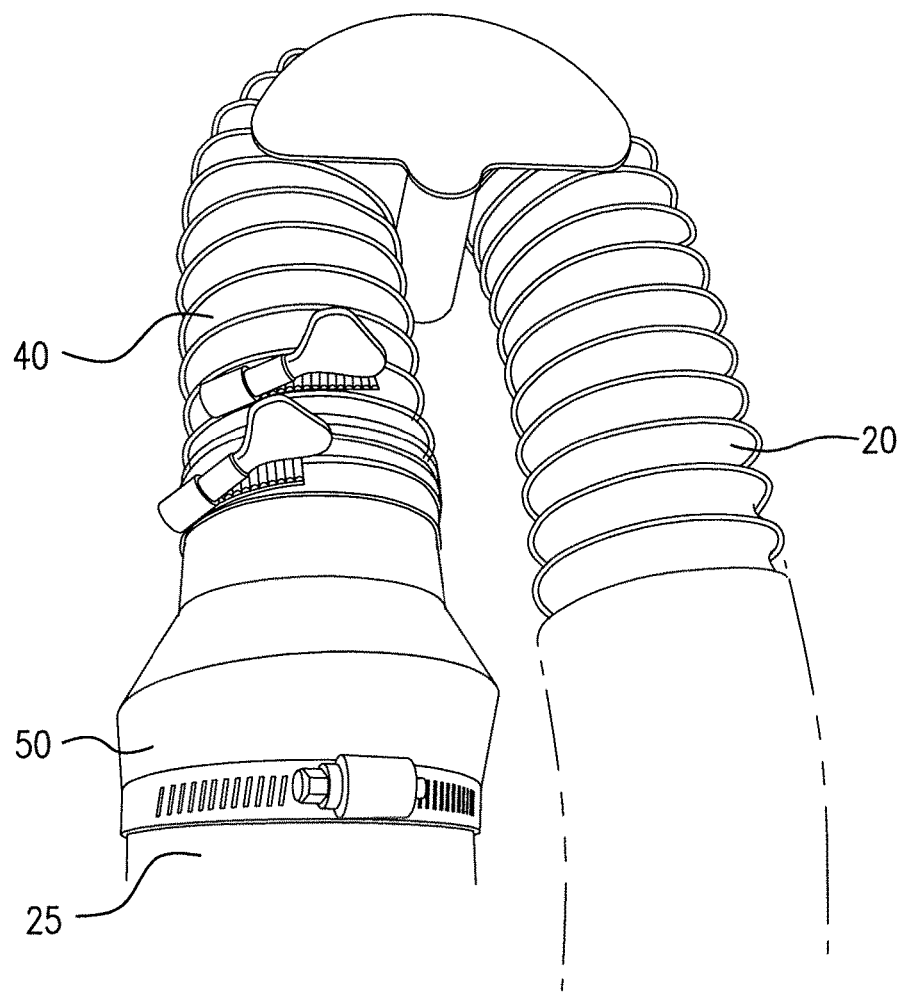
FIG. 2 is a perspective view of a portion of an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners according to one embodiment of the present invention.
Figure 3:
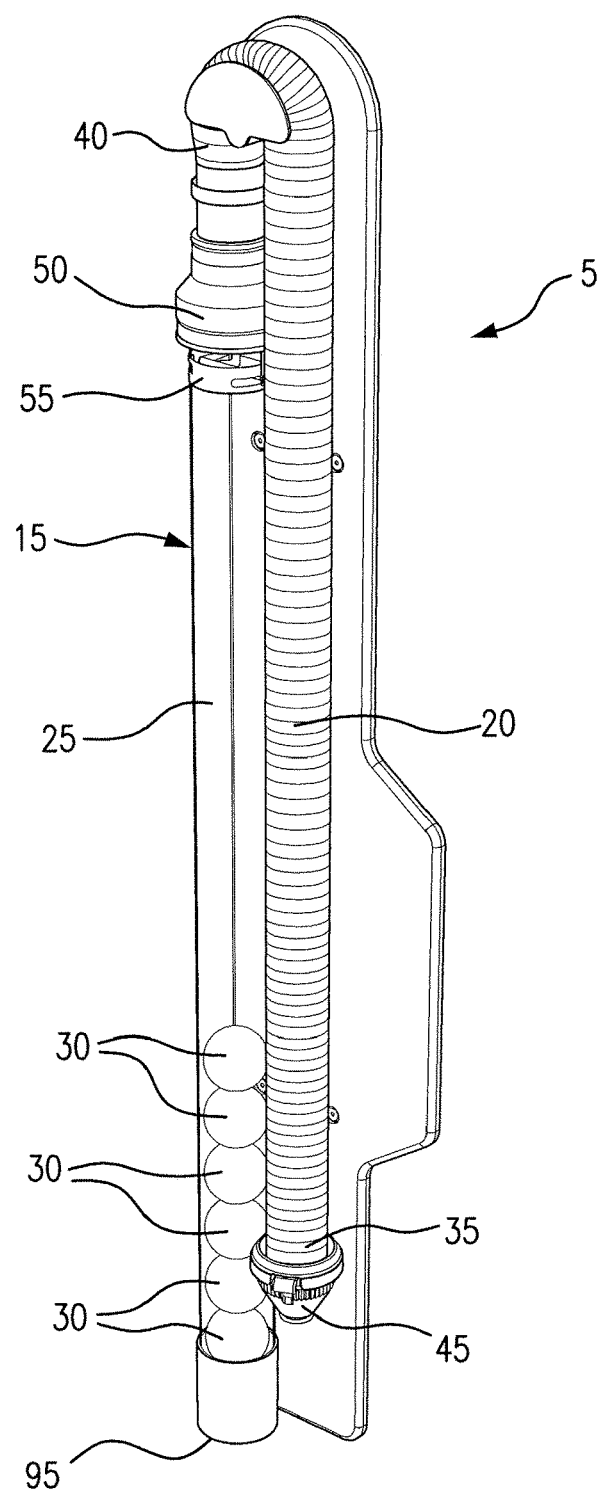
FIG. 3 is a perspective view of an indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners according to one embodiment of the present invention.
Figure 4:
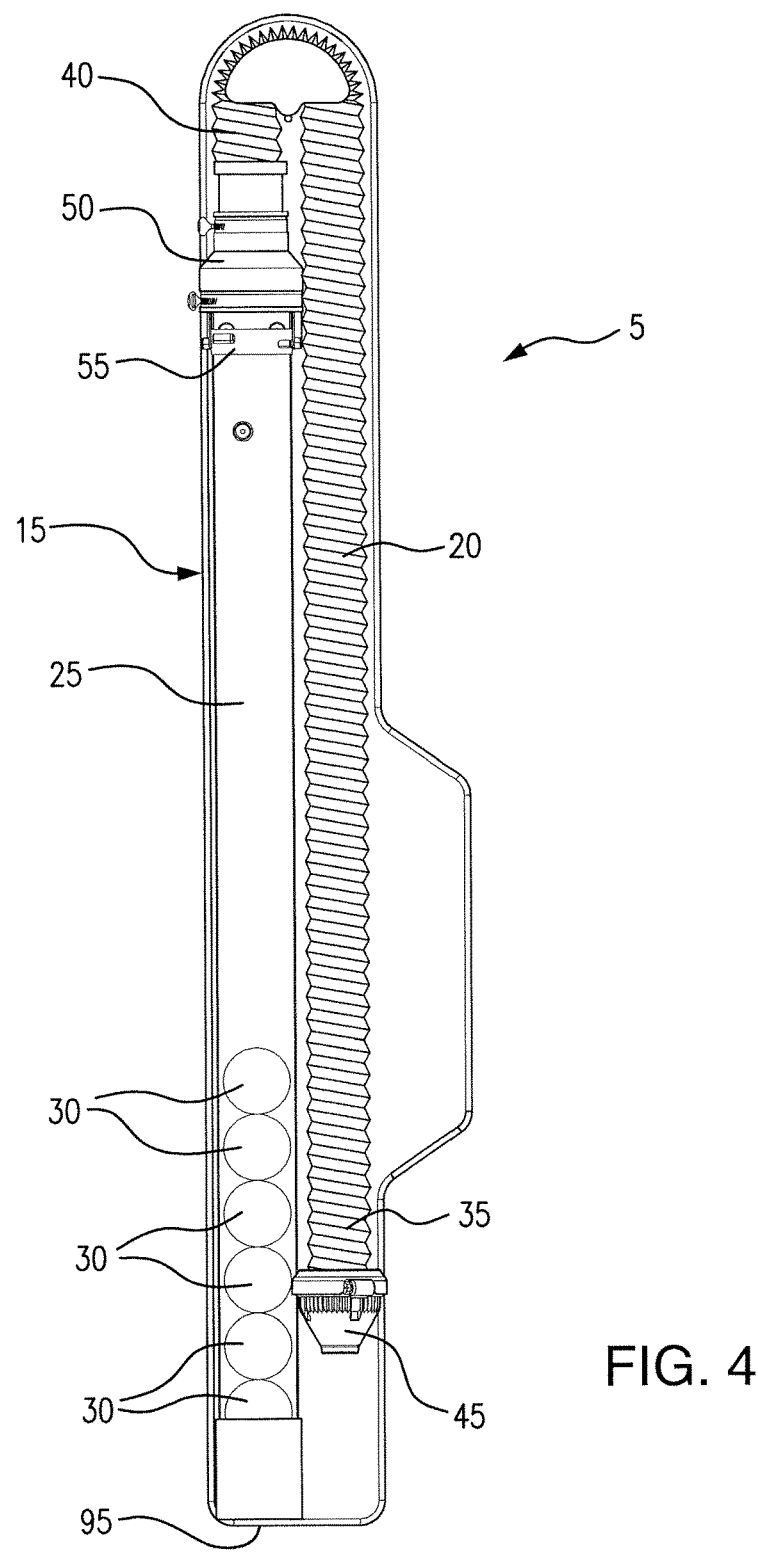
FIG. 4 is a front view of the embodiment of an indicator shown in FIG. 3.
Figure 5:
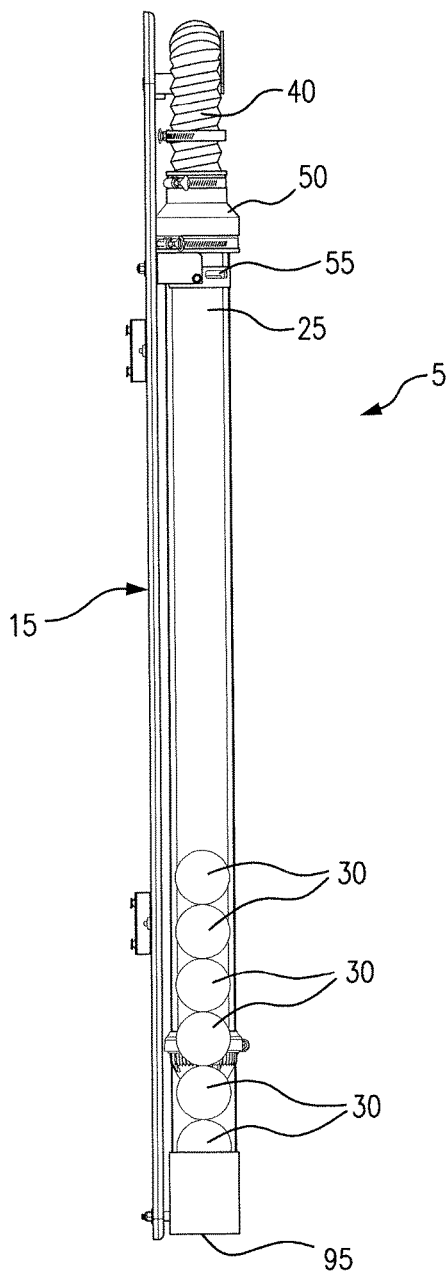
FIG. 5 is a side view of the embodiment of an indicator shown in FIG. 3.
Figure 6:
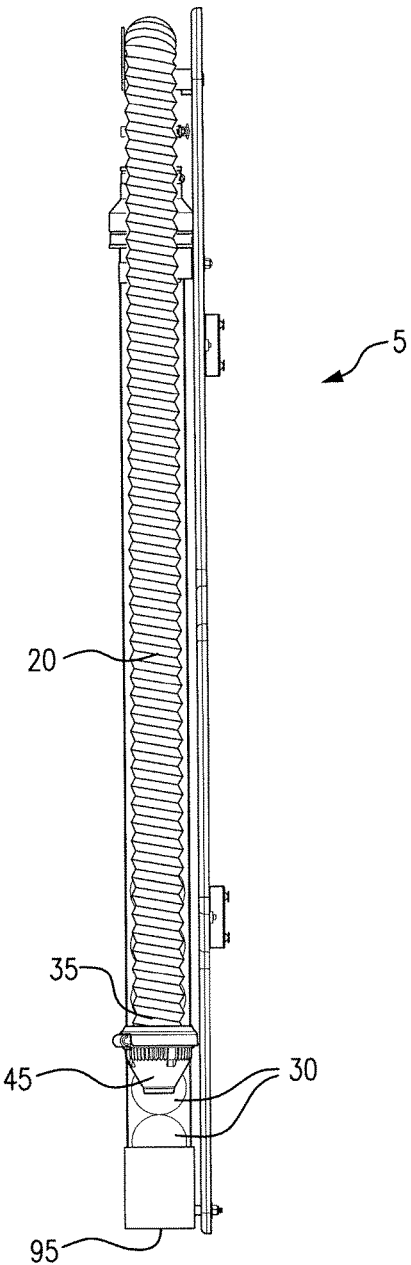
FIG. 6 is another side view of the embodiment of an indicator shown in FIG. 3.
Figure 7:
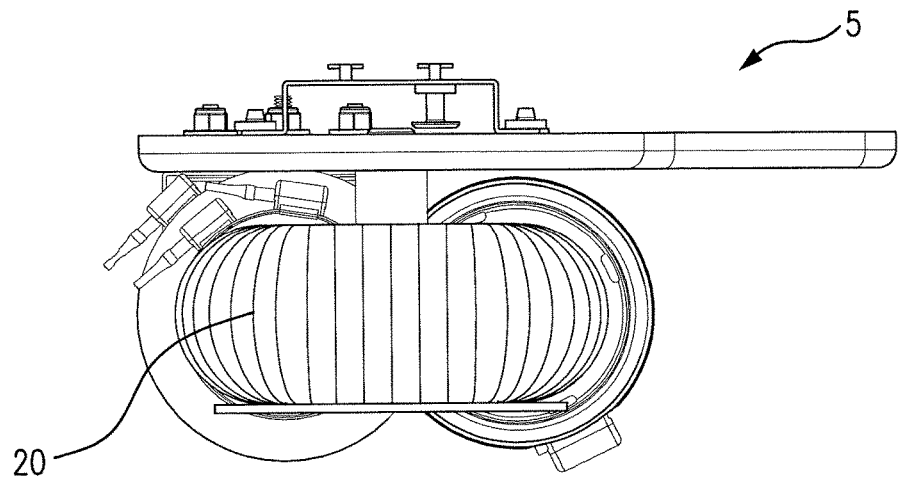
FIG. 7 is a top view of the embodiment of an indicator shown in FIG. 3.

The second end 40 of the air conduit 20 is connected to the vacuum response unit 15. The second end 40 of the air conduit 20 can be directly or indirectly connected to the vacuum response unit 15. With an indirect connection, there is another component between the second end 40 and the vacuum response unit 15. As shown in FIGS. 1 and 2, a transition coupler 50 is secured to the second end 40 of the air conduit 20 and to the tube 25 of the vacuum response unit 15. The transition coupler 50 is used in this embodiment due to differences in diameter between the air conduit 20 and the tube 25. The air conduit 20 and the tube 25 are coupled with the transition coupler 50 using band clamps though other techniques known to those of skill in the art can also be used. In other embodiments, the air conduit 20 can be connected directly to the tube 25 of the vacuum response unit 15 or indirectly using components other than transition couplers.

In the embodiment shown, the air conduit 20 is selectively connectable to the input ports of the vacuum cleaners 10 by moving the air conduit 20 to the desired vacuum cleaner 10 and connecting the nozzle or adaptor 45 to the input port of the vacuum cleaner 10. After a vacuum cleaner 10 is activated and its cleaning effectiveness is evaluated on the vacuum response unit 15, the adaptor 45 can be connected to the input port of a different vacuum cleaner 10 to compare its cleaning effectiveness to other vacuum cleaners. As shown in FIGS. 1-8, the air conduit 20 can be made from a flexible, stretchable hose to facilitate connection with vacuum cleaners 10 positioned at different distances and on opposite sides of the vacuum response unit 15.

In general, a potential purchaser or renter can readily evaluate the cleaning effectiveness of multiple vacuum cleaners using indicators according to various embodiments of the present invention. In embodiments, where a single air conduit 20 is used, the potential purchaser or renter can connect the air conduit 20 directly or indirectly to an input port of a vacuum cleaner 10 to be evaluated. Once connected, the potential purchaser or renter can activate the vacuum cleaner (e.g., turn on the power to the vacuum cleaner) and observe the vacuum response unit 15. In embodiments where the vacuum response unit 15 comprises a tube 25 with a plurality of items 30 (e.g., tennis balls 30), the potential purchaser or renter may observe how quickly the items 30 are drawn to the top of the tube 25, the number of items 30 drawn to the top of tube 25, the manner in which the number of items 30 are drawn to the top of the tube 25 (e.g., as a group or sequentially), and other indicators of cleaning effectiveness. The potential purchaser or renter can then deactivate or power off the vacuum cleaner and connect the air conduit 20 directly or indirectly to an input port of a second vacuum cleaner. The second vacuum cleaner can then be activated and its cleaning effectiveness evaluated using the vacuum response unit 15. The potential purchaser or renter can evaluate a number of different vacuum cleaners 10 depending on the particular display.

In other embodiments, an air conduit 20 can be selectively connectable to input ports of vacuum cleaners in other manners. For example, a first air conduit can have an end that is connected to a vacuum response unit 15 and can then extend near or past a plurality of vacuum cleaners. A plurality of additional air conduits can extend from the first air conduit toward two or more of the vacuum cleaners. In such an embodiment, the first air conduit 20 can be a primary air conduit with each of the additional air conduits branching off of the first air conduit as secondary air conduits. In some embodiments, each of the secondary air conduits can be connected to an input port of a different vacuum cleaner. The secondary air conduits can be connected directly to the input ports or indirectly connected (e.g., another component such as an adapter or nozzle connects the secondary air conduit to the input port). In some such embodiments, each of the secondary air conduits can comprise a one-way check valve. The one-way check valves can be arranged to open only when the vacuum cleaner connected to the associated secondary air conduit is activated. Thus, when a vacuum cleaner is activated, the one-way check valve opens and the suction power from that vacuum cleaner is applied to the vacuum response unit 15 in order for the user to evaluate the cleaning effectiveness of the vacuum cleaner. This permits the potential purchaser or renter to evaluate multiple vacuum cleaners, each of which are coupled to the first or primary air conduit 20 by a secondary air conduit, by simply activating them one at a time. In some embodiments, the potential purchaser or renter is not required to connect an end of an air conduit 20 to an input port although in other embodiments, the number of secondary air conduits connected to a primary air conduit may be fewer than the number of vacuum cleaners such that one secondary air conduit may be configured to be connected to two or more vacuum cleaners. While one-way check valves can be used in some embodiments to control which vacuum cleaner is providing suction power to the vacuum response unit, other devices known to those of skill in the art can be also be used including, for example, gate valves, globe valves, and others.

In some embodiments, indicators 5 of the present invention can comprise a responsiveness adjustment mechanism adapted to calibrate the responsiveness of the indicator 5 to different ranges of cleaning effectiveness. In some embodiments, the responsive adjustment mechanism comprises a valve for selectively regulating a resistance to air flow into the vacuum response unit. In the embodiment shown in FIGS. 1-8, a valve 55 for selectively regulating a resistance to air flow is provided at an upper end of the tube 25.

Figure 10:
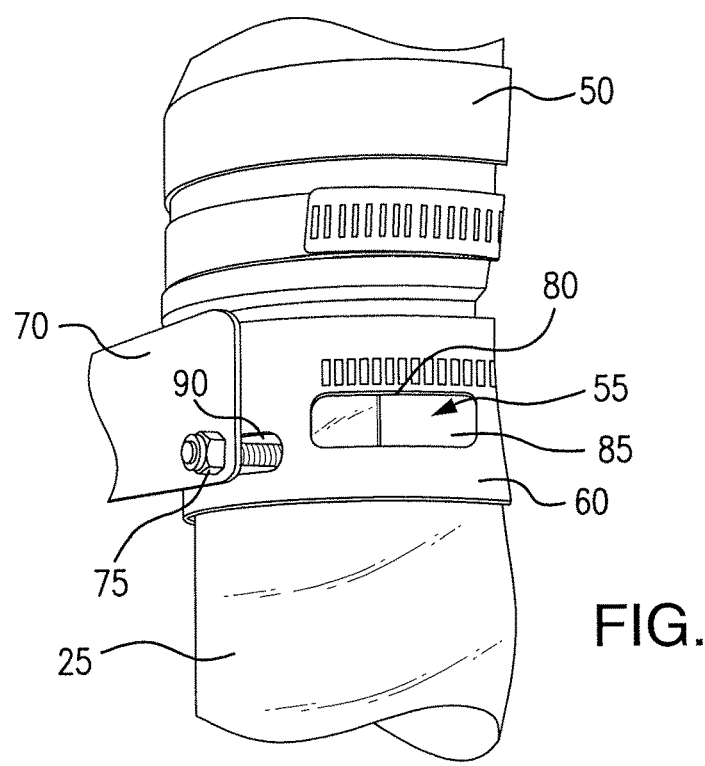
Figure 11:
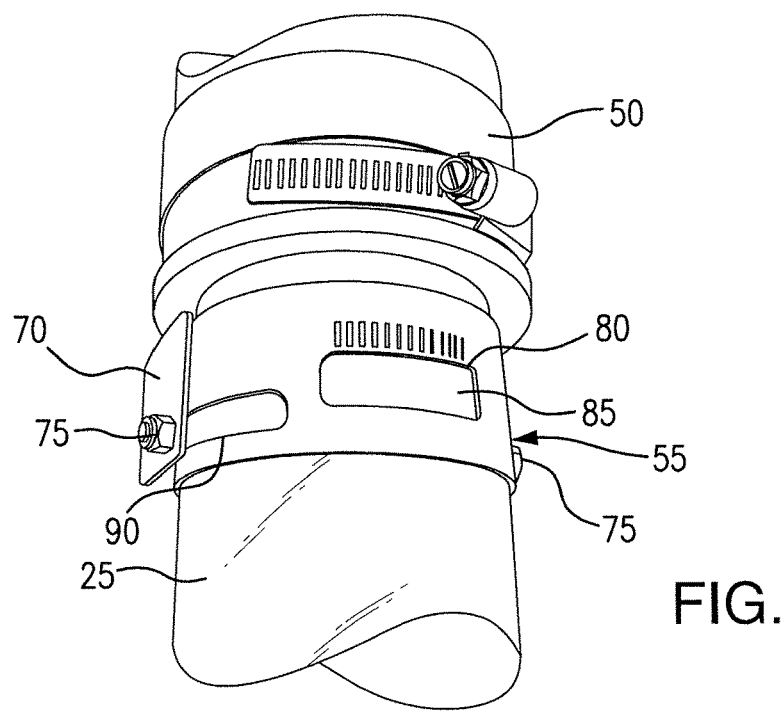

FIGS. 9-12 illustrate the assembly and operation of a valve 55 according to one embodiment. A rotatable band 60 is provided at an upper end of the tube 25. A threaded fastener 65 passes through the hollow tube 25, through the rotatable band 60, and through a bracket 70 which also serves to hold the tube 25 in position. Two nuts 75 are coupled to opposite ends of the threaded fastener 65 and can be tightened or loosened as needed to impact the ease at which the rotatable band 60 may rotate. The rotatable band 60 comprises a plurality of slots. A first slot 80 in the rotatable band 60 slides across a corresponding hole 85 in the tube 25. Depending on the relative position of the rotatable band 60 and the first slot 80 on the tube 25, the opening 85 in the tube 25 can be completely closed (FIG. 9), partially open (FIG. 10), or completely open (FIG. 11). It is this opening/closing of the hole 85 in the tube 25 by rotation of the band 60 that acts as the valve in this embodiment. When the valve 55 is open, more air is drawn into the tube 25 by the suction power of a connected and activated vacuum cleaner such that less suction power is available to lift the plurality of items 30 or other material in the tube 25 beneath the valve 55. Thus, in some embodiments, this valve 55 permits calibration of the vacuum response unit 15 (and the indicator) to different ranges of cleaning effectiveness.

Figure 12:
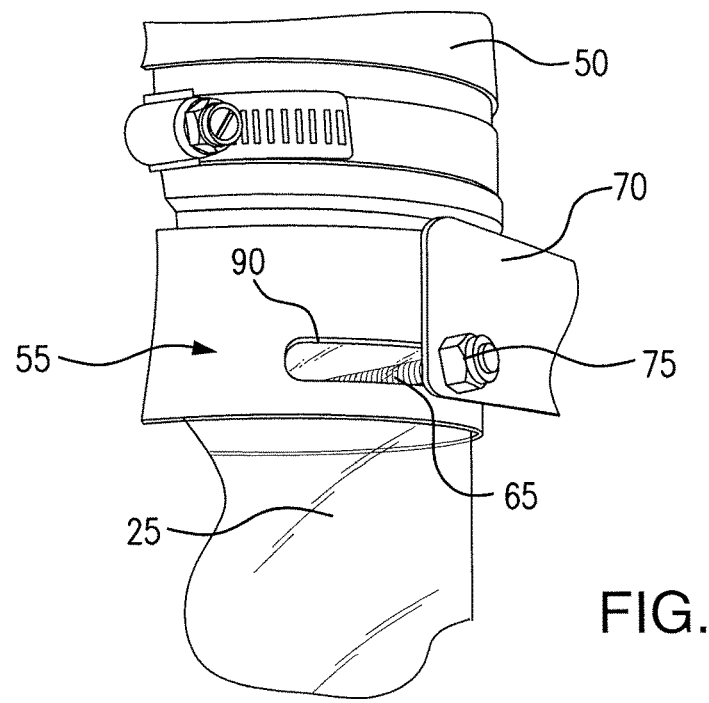

The rotatable band 60 can rotate on the outer surface of the tube 25 in a number of ways. In the embodiment shown, the rotatable band 60 comprises two additional slots 90 (FIGS. 10 and 12). The threaded fastener 65 passes through these slots 90 in addition to passing through openings in the bracket 70, between the nuts 75. The end portions of the threaded fastener 65 hold the rotatable band 60 in position vertically on the tube 25 while permitting it to rotate by virtue of the slots 90. Persons of skill in the art, based on the disclosure herein, can identify other techniques by which a rotatable band or other structure can be used to open/close the hole in the tube 25 to provide a valve.

Figure 13:
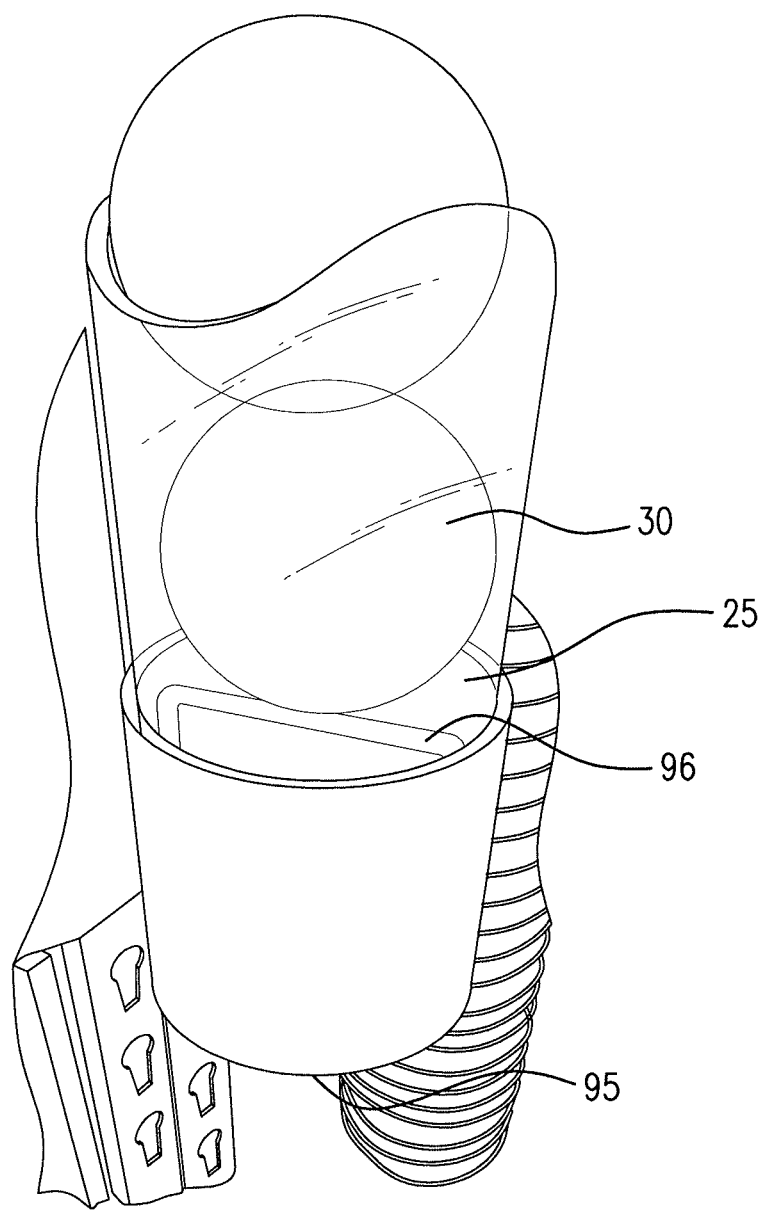
FIG. 13 is a partial, perspective view of a lower end of a tube with an air intake as part of an indicator according to one embodiment of the present invention.
Figure 14:
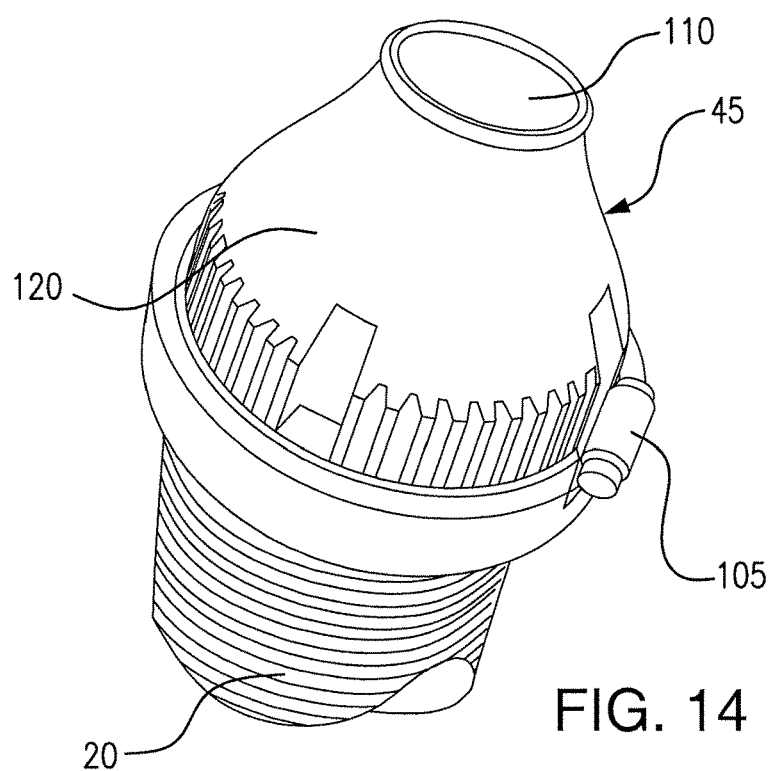
FIGS. 14-18 are perspective views of one embodiment of an adaptor that facilitates connection of an air conduit to a plurality of different sizes of input ports of vacuum cleaners that can be used in various embodiments of indicators and systems of the present invention.
Figure 15:
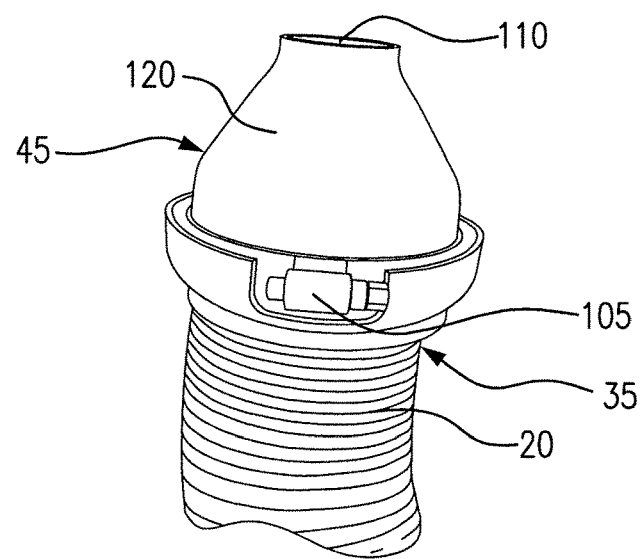
Figure 16:
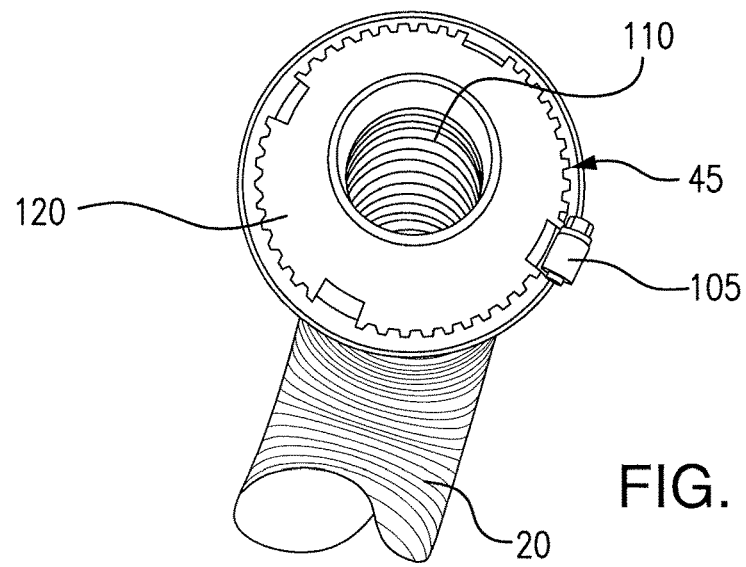
Figure 17:
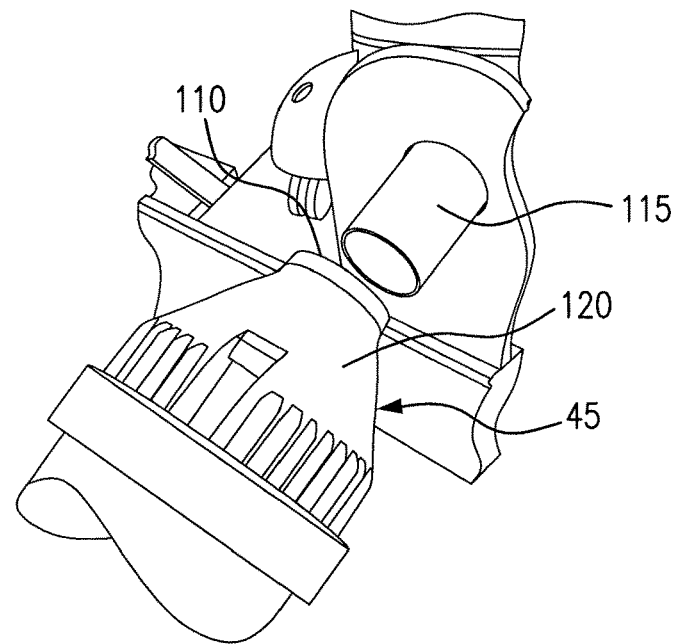

In some embodiments, a responsiveness adjustment mechanism adapted to calibrate the responsiveness of the indicator 5 to different ranges of cleaning effectiveness can comprise an adjustable air intake in an air flow path between a vacuum response unit 15 and a first end of an air conduit 20. Such an adjustable air intake can be in addition to a valve for selectively regulating a resistance to air flow into the vacuum response unit 15 in some embodiments. In the embodiment shown in FIGS. 1-8, an adjustable air intake 95 is provided at a lower end of the tube 25 beneath the plurality of items 30. FIG. 13 shows a lower end of the tube 25 with a bar 96 holding the plurality of items 30 above the air intake 95. The air intake 95 can be made adjustable using a variety of techniques known to those of skill in the art. For example, the cross-sectional area of the opening in the bottom of the tube 25 through which air enters the tube 25 can be made larger or smaller using a variety of techniques.

In the embodiment shown in FIGS. 1-8, a nozzle or adaptor 45 is coupled to the first end 35 of the air conduit 20 and can be connected directly to an input port of a vacuum cleaner 10. In general, any nozzle or adaptor known to those of skill in the art can be used to connect an air conduit 20 to an input port of a vacuum cleaner 10. Some embodiments of the present invention incorporate an adaptor for facilitating connection of the conduit to a plurality of different sizes of input ports of vacuum cleaners. In some embodiments, an adaptor can be configured to adapt the air conduit 20 for connection to input ports on vacuum cleaners having a plurality of nominal diameters (e.g., 1¼ inch, 1½ inch, and/or 2½ inches).

Figure 18:
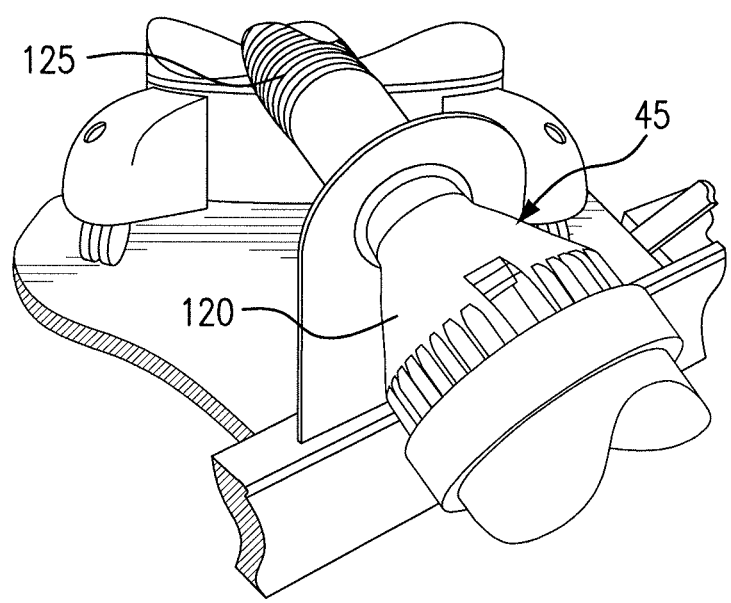

FIGS. 14-18 show one embodiment of an adaptor 45 that facilitates connection of an air conduit to a plurality of different sizes of input ports of vacuum cleaners. The adaptor 45 is connected to a second end 35 of the air conduit 20 using a band clamp 105. Other techniques known to those of skill in art can be used to connect an adaptor 45 to an air conduit 20. In the embodiment shown, the adaptor 45 includes an opening 110 opposite the end that is coupled to the air conduit 20. In this embodiment, the opening 110 has a diameter that permits it to slide over or against an input port 115 of a vacuum cleaner to connect the air conduit 20 to the vacuum cleaner as shown, for example, in FIG. 17. In the embodiment shown, the adaptor 45 also includes a tapered portion 120 between the end with the opening 110 and the end that is connected to the air conduit 20. The tapered portion 120 can be configured in some embodiments for the adaptor 45 to bear hermetically against a plurality of different sizes of input ports of vacuum cleaners in order to connect the air conduit 20 to the input port. FIG. 18 illustrates how this embodiment of an adaptor 45 can be placed against an input port 125 of a vacuum cleaner to connect the air conduit 20 with the input port 125. The tapered portion 120 of the adaptor 45 permits it to advantageously slide at least partially into input ports with larger diameter openings as well.

Figure 19:
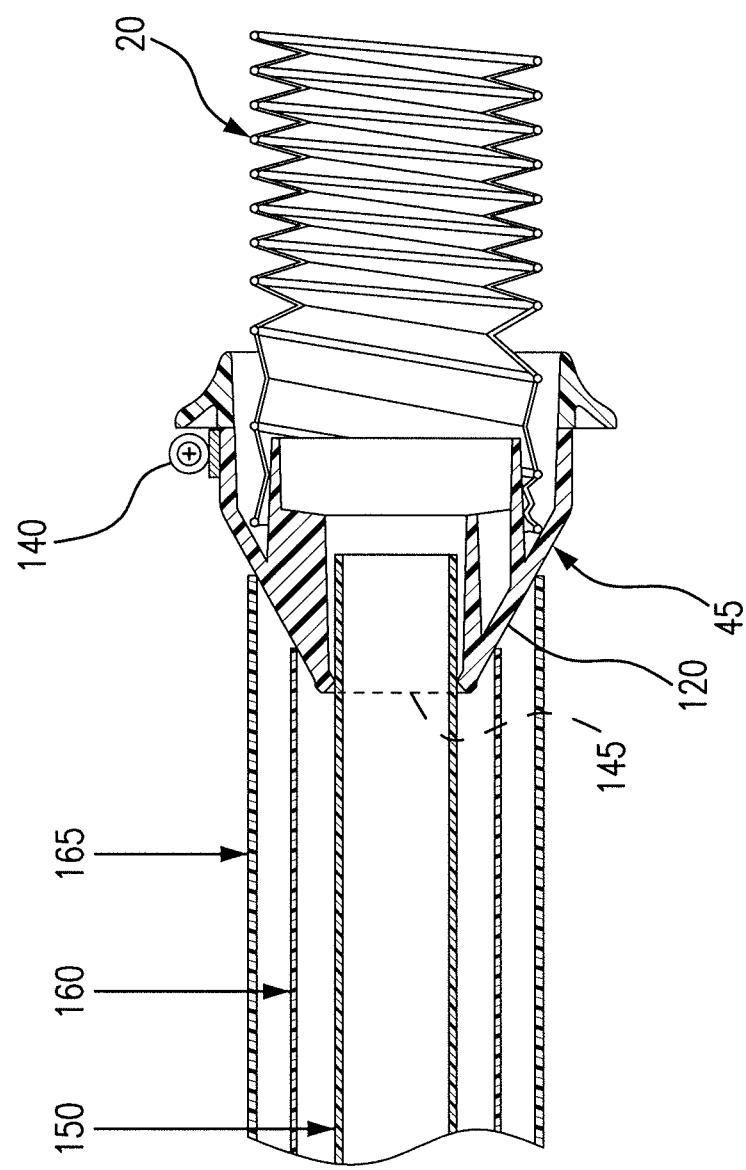
FIG. 19 is a cross-sectional drawing of an embodiment of an adaptor that facilitates connection of an air conduit to a plurality of different sizes of input ports of vacuum cleaners that can be used in various embodiments of indicators and systems of the present invention.
Figure 20:
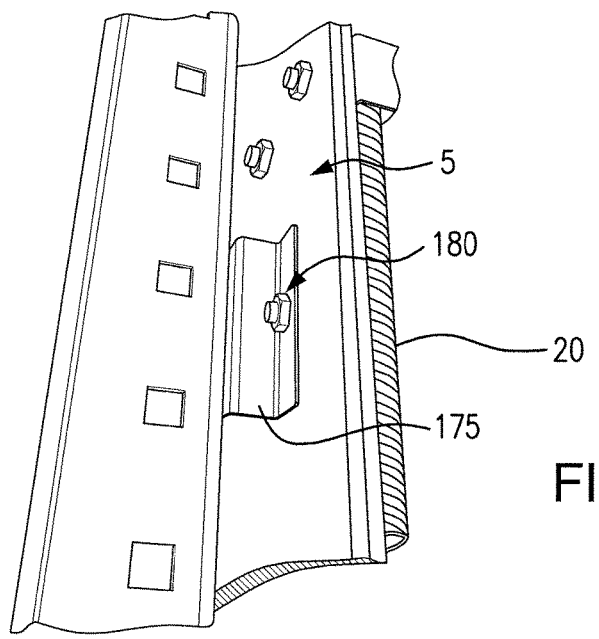
Figure 21:
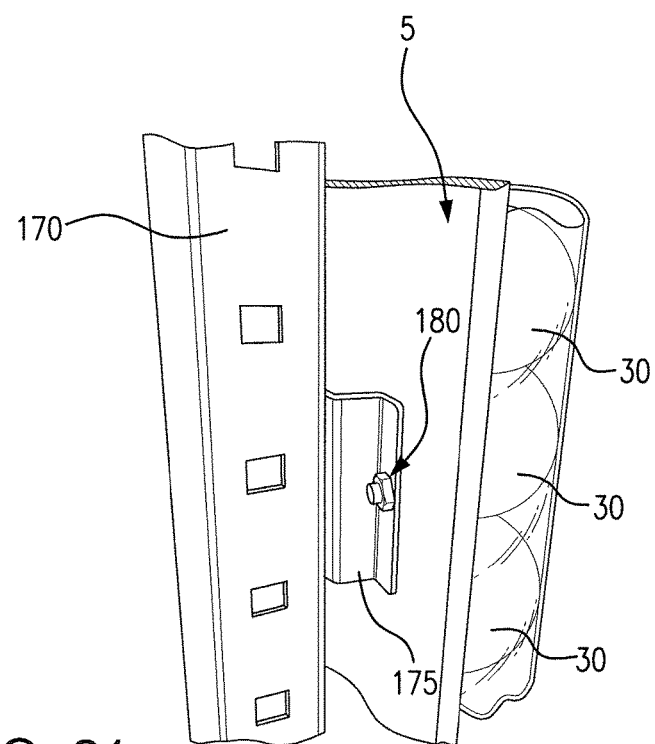

FIG. 19 is a cross-sectional drawing of an embodiment of an adaptor 45 that further illustrates these features. The adaptor 45 is connected with an air conduit 20 using a band clamp 140. One end of the adaptor 45 includes an opening 145 that, in this embodiment, can accommodate a nominal 1¼ inch vacuum hose (input port) from a vacuum cleaner. The adaptor 45 also includes a tapered portion 120 that, in this embodiment, can slide at least partially into a nominal 1½ inch vacuum hose (input port) or a 2½ inch vacuum hose (input port) from a vacuum cleaner. This embodiment of an adaptor 45 again advantageously facilitates connection of an air conduit 20 with a plurality of different sizes of input ports 150,160,165 of vacuum cleaners.

In some embodiments, an indicator 5 or system of the present invention further comprises a mounting mechanism for securing the indicator 5 to a display system where samples of different vacuum cleaners are displayed. FIG. 1 shows an indicator 5 mounted to a display 170 where multiple vacuum cleaners 10 are available for evaluation. FIGS. 20-22A illustrate one way in which an indicator 5 can be secured to a display system 170 according to one embodiment of the present invention. In this embodiment, a bracket 175 is coupled to the indicator 5 using a fastener 180 such as a screw or a bolt and/or a nut. As shown in FIG. 22A, the bracket 175 comprises two holes (not visible) through which two fasteners 185,190 can pass to secure the indicator 5 to the display system 170 via the holes 195 in the display system 170. Fasteners that can be used in various embodiments of mounting mechanisms can include, for example, bolts, screws, zip ties, posts, and/or any combinations thereof. In some embodiments, as shown in FIGS. 22B and 22C, the bracket 175 can include a key-hole engagement feature 176 that engages one of several key-hole shaped openings 177 (or inverted, teardrop-shaped openings 177) in the display system 170. The key-hole engagement feature 176 can include a main body 176A and a head 176B that is wider than the main body 176A. The key-hole engagement feature 176 can be implemented using a bolt or other structure that includes a head 176B that fits through a wider, upper portion of the key-hole shaped openings 177 in the display system 170 and that can be lowered with the bracket 175 so that the main body 176A enters and comes to rest in a narrower, lower portion of the openings 177 so that the head 176B interferes with removal of the key-hole engagement feature 176 from the display system 170. In the embodiment shown, the key-hole engagement feature 176 includes a nut 176C that helps secure the key-hole engagement feature 176 to the bracket 175. The key-hole engagement feature 176 can be threaded or otherwise connected to the bracket 175, or it can be integrally secured thereto. The bracket 175 can include one or more such key-hole engagement features 176 to engage respective ones of the openings 177. In some embodiments, such as the embodiment shown in FIGS. 22B and 22C, the weight of the indicator 5 helps keep the bracket 175 (and thereby the indicator 5) mounted to the display system 170.

Figure 22D:
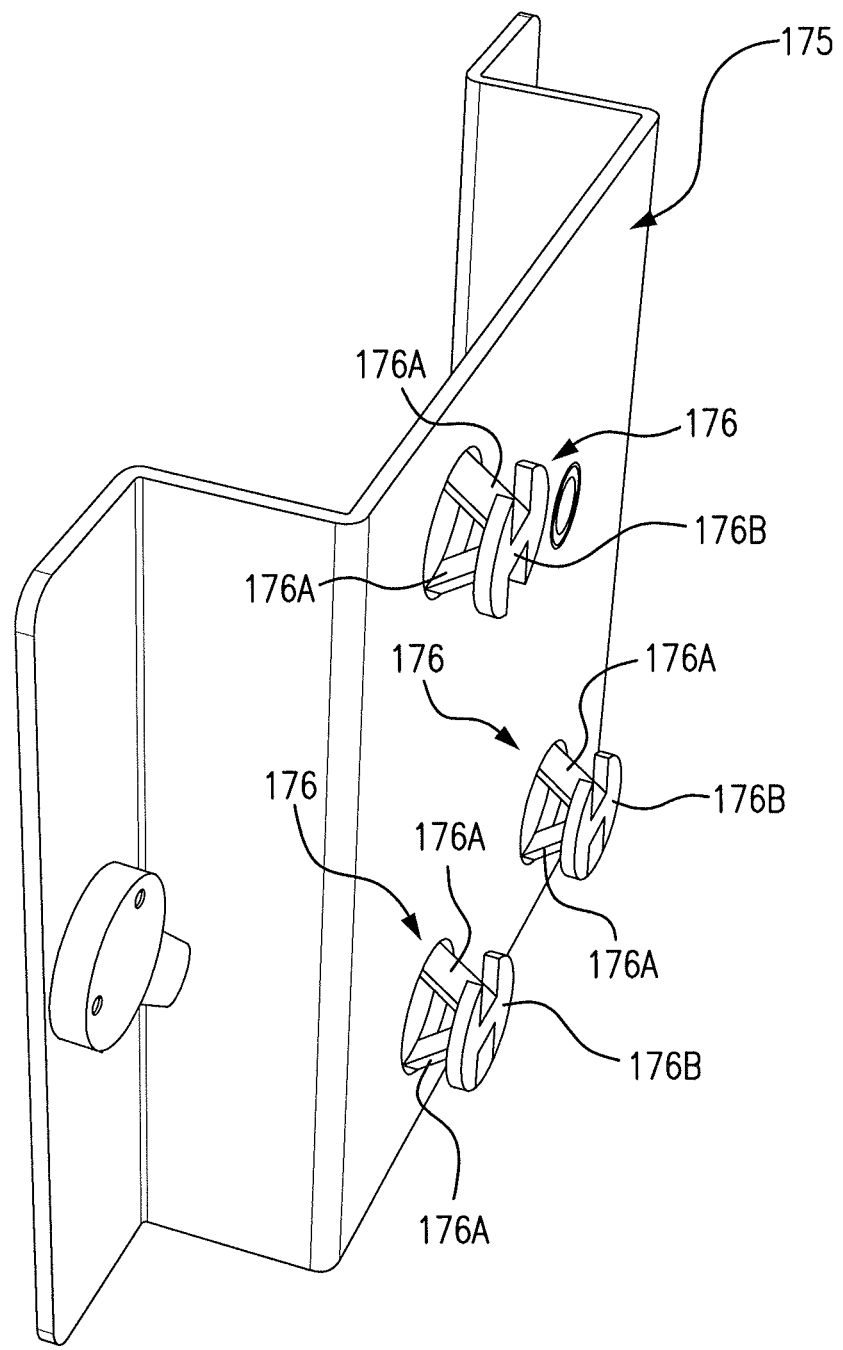
FIG. 22D is a perspective view of a bracket for use in mounting an indicator to a display system according to one embodiment of the present invention.

In some embodiments, as shown in FIG. 22D, the display system 170 can include more than one column of openings 177 (as shown in FIG. 22A), and the bracket 175 can include laterally spaced key-hole engagement features 176. The key-hole engagement features 176 can be configured to have legs 176A and a head 176B secured to the legs 176A.

In some embodiments, the mounting mechanism can be implemented using shapes different from a key-hole or inverted teardrop. T-shaped openings, cleats, hooks, and other forms of mounting can be utilized instead of, or in addition to, the key-shaped openings 177 and engagement feature 176 shown in FIGS. 22B to 22D.

Figure 23:
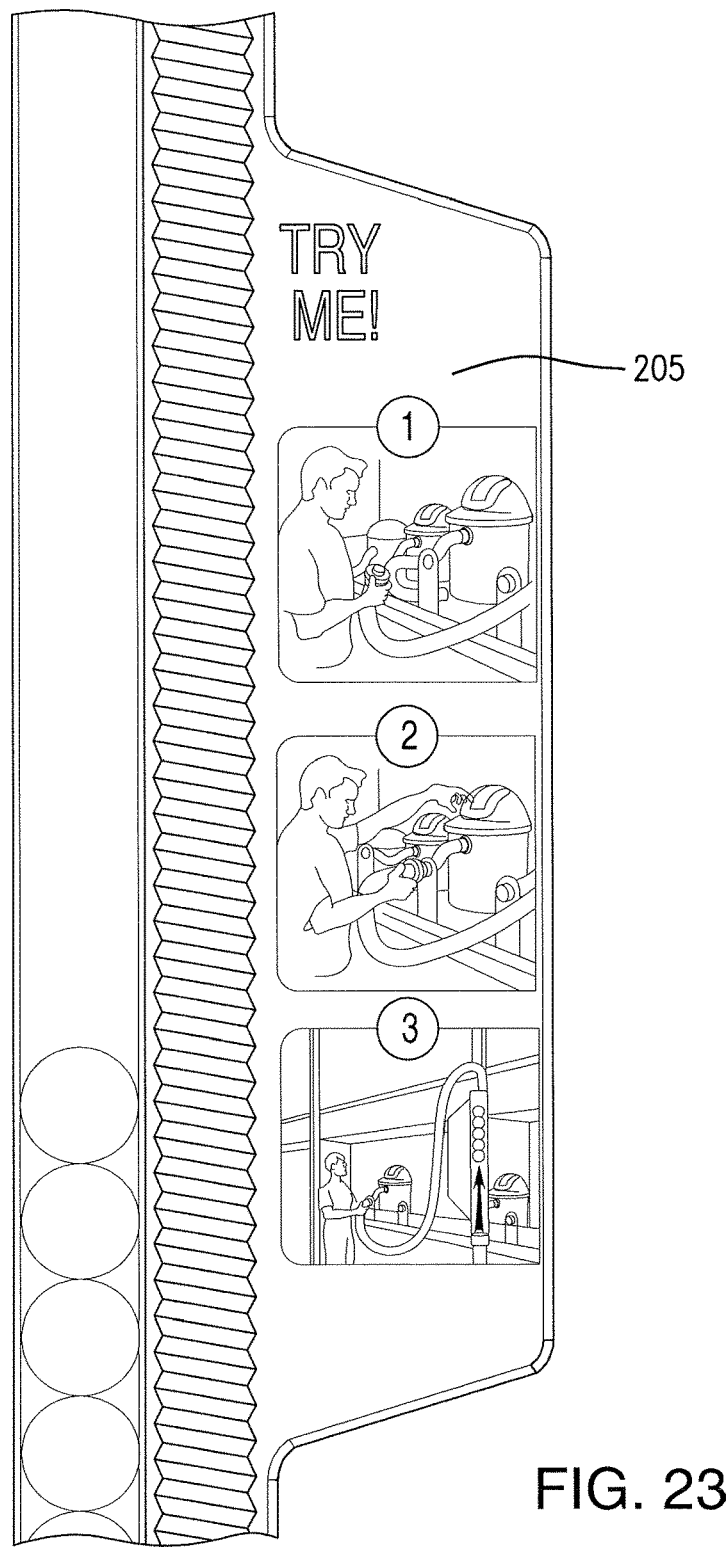
FIG. 23 is a front view of signage that can be associated with an indicator according to one embodiment of the present invention.
Figure 24:
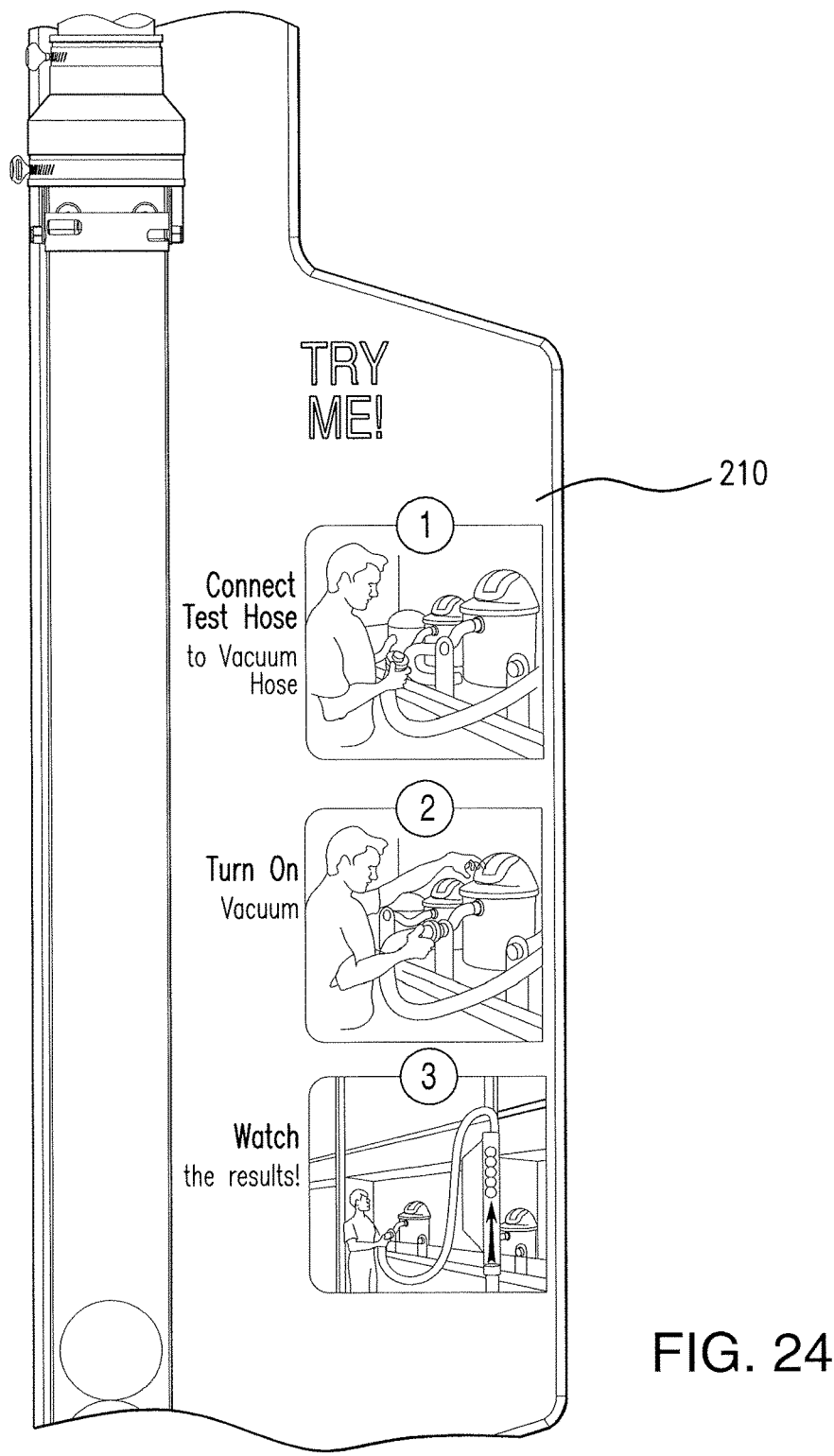
FIG. 24 is a front view of another example of signage that can be associated with an indicator according to one embodiment of the present invention.

In some embodiments, an indicator can comprise signage. The signage can, for example, include instructions on how to operate the indicator to provide an indication of cleaning effectiveness, information about the vacuum cleaners displayed, or other information. The indicator 5 shown in FIG. 1 includes an example of where such signage 200 could be located, though persons of ordinary skill in the art will recognize, based on the teachings herein, that the signage could be positioned in a variety of other locations. FIG. 23 shows a type of information that can be included on signage 205 according to one embodiment. FIG. 24 illustrates another example of the type of information that can be included on signage according to another embodiment 210.

Various embodiments of the indicators and systems disclosed herein can include a number of advantages. For example, indicators and systems of the present invention can enable customers to tangibly and visibly experience the performance of a vacuum cleaner. This can be significant because, for example, such experience engages more of a customer's senses allowing them to make stronger, visceral connections to the vacuum cleaners. As another example, once a customer observes the cleaning effectiveness, such experience could make them less likely to choose a vacuum cleaner with less (or more) power than is needed. These are just a few of the advantages of the various embodiments disclosed herein.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

That which is claimed is:

1. An indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprising:
   a vacuum response unit comprising a vertically extending elongate tube containing a plurality of items; and
   an air conduit comprising a first end that is selectively connectable to an input port of any one of at least two of the different vacuum cleaners, and a second end that is connected to the vacuum response unit,
   wherein the plurality of items are adapted to rise in the tube when sufficient suction power is provided by the any one of at least two of the different vacuum cleaners after being connected to the air conduit.

2. The indicator of claim 1, wherein the first end of the air conduit is selectively connectable to the input port directly or indirectly.

3. The indicator of claim 2, further comprising a component positioned between the first end of the air conduit and the input port.

4. The indicator of claim 3, wherein the component comprises a second air conduit coupled to the first air conduit.

5. The indicator of claim 4, wherein the second air conduit comprises a one-way check valve.

6. The indicator of claim 4, wherein the air conduit is selectively connectable to an input port of a second vacuum cleaner of the different vacuum cleaners directly or indirectly.

7. The indicator of claim 6, further comprising a third air conduit positioned between the air conduit and the input port of the second vacuum cleaner.

8. The indicator of claim 7, wherein the third air conduit comprises a one-way check valve.

9. The indicator of claim 1, wherein the second end of the air conduit is directly or indirectly connected to the vacuum response unit.

10. The indicator of claim 9, further comprising a component between the second end of the air conduit and the vacuum response unit.

11. The indicator of claim 10, wherein the component is a second air conduit.

12. The indicator of claim 1, further comprising signage associated with the indicator, wherein the signage includes instructions on how to operate the indicator to provide an indication of cleaning effectiveness.

13. The indicator of claim 1, wherein the vacuum response unit is adapted to provide an indication of cleaning effectiveness in a visual manner.

14. The indicator of claim 1, wherein the vacuum response unit is adapted to visually indicate suction power and air flow of the any one of at least two of the different vacuum cleaners.

15. The indicator of claim 1, wherein the vacuum response unit is adapted to respond to a combination of air flow and suction to achieve the indication of cleaning effectiveness.

16. The indicator of claim 1, wherein the plurality of items are arranged in the tube so as to rise against gravitational force in a manner indicative of cleaning effectiveness of the any one of at least two of the different vacuum cleaners when activated and connected to the first end of the air conduit.

17. The indicator of claim 1, wherein the tube is a hollow cylinder and has an inner diameter of less than 4 inches.

18. The indicator of claim 17, wherein the plurality of items comprises a plurality of spheres, each sphere having a diameter of between 2.5 inches and 2.75 inches.

19. The indicator of claim 18, wherein the inner diameter of the cylinder is about 3 inches.

20. The indicator of claim 1, wherein the plurality of items comprises a plurality of spheres and the difference between the inner diameter of the tube and the diameter of each sphere is 0.5 inches or less.

21. The indicator of claim 1, wherein the tube is substantially transparent.

22. The indicator of claim 1, wherein the tube is a hollow cylinder and the plurality of items comprises a plurality of spheres.

23. The indicator of claim 22, wherein the spheres are tennis balls.

24. The indicator of claim 1, further comprising a responsiveness adjustment mechanism adapted to calibrate the responsiveness of the indicator to different ranges of cleaning effectiveness.

25. The indicator of claim 24, wherein the responsiveness adjustment mechanism comprises a valve for selectively regulating a resistance to air flow into the vacuum response unit.

26. The indicator of claim 24, wherein the responsiveness adjustment mechanism comprises an adjustable air intake in an air flow path between the vacuum response unit and the first end of the air conduit.

27. The indicator of claim 1, further comprising a valve proximate the second end of the tube, wherein the valve is actuatable to selectively regulate air flow through the vacuum response unit.

28. The indicator of claim 1, further comprising an adaptor for facilitating connection of the conduit to a plurality of different sizes of input ports of the different vacuum cleaners.

29. The indicator of claim 28, wherein the adaptor is configured to adapt the air conduit for connection to input ports of the different vacuum cleaners that have any one of the following nominal diameters: 1¼-inch, 1½-inch, or 2½-inch.

30. An indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprising:
a mounting mechanism for securing the indicator to a display system where the samples are displayed;
a vacuum response unit comprising a vertically extending elongate tube containing a plurality of items; and
an air conduit having a first end that is selectively connectable to an input port of any one of at least two of the different vacuum cleaners, and a second end that is connected to the vacuum response unit,
wherein the plurality of items are adapted to move in the tube when sufficient suction power is provided by the any one of at least two of the different vacuum cleaners after being connected to the air conduit.

31. An indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprising:
a vacuum response unit comprising a vertically extending elongate tube containing a plurality of items; and
an air conduit having a first end comprising an adaptor for facilitating connection of the conduit to a plurality of different size input ports of the different vacuum cleaners, and a second end that is connected to the vacuum response unit,
wherein the plurality of items are adapted to move in the tube when sufficient suction power is provided by a vacuum cleaner of the different vacuum cleaners after being connected to the air conduit.

32. An indicator of cleaning effectiveness for deployment in an environment where samples of different vacuum cleaners are displayed for consideration by potential purchasers or renters of such vacuum cleaners, to facilitate comparisons of cleaning effectiveness between or among the different vacuum cleaners, comprising:
a mounting mechanism for securing the indicator to a display system where the samples are displayed;
a vacuum response unit adapted to respond to cleaning effectiveness of any one of at least two of the different vacuum cleaners by communicating an indication of cleaning effectiveness to a user of the indicator; and
an air conduit having a first end that is selectively connectable to an input port of the any one of at least two of the different vacuum cleaners, and a second end that is connected to the vacuum response unit.

33. A system to facilitate comparisons of cleaning effectiveness between or among different vacuum cleaners by potential purchasers or renters of such vacuum cleaners, the system comprising:
a plurality of different vacuum cleaners;
a vacuum response unit comprising a vertically extending elongate tube containing a plurality of items; and
an air conduit comprising a first end that is selectively connectable to an input port of any one of at least two of the different vacuum cleaners, and a second end that is connected to the vacuum response unit, wherein the plurality of items are adapted to rise in the tube when sufficient suction power is provided by the any one of the plurality of different vacuum cleaners after being connected to the air conduit.

* * * * *